(12) United States Patent
Shu

(10) Patent No.: US 12,408,029 B2
(45) Date of Patent: Sep. 2, 2025

(54) BLUETOOTH NETWORKING METHOD FOR ELECTRONIC DEVICE AND RELATED DEVICE

(71) Applicant: Huawei Technologies Co., Ltd., Shenzhen (CN)

(72) Inventor: Yuhua Shu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 225 days.

(21) Appl. No.: 17/916,541

(22) PCT Filed: Apr. 2, 2021

(86) PCT No.: PCT/CN2021/085299
§ 371 (c)(1),
(2) Date: Sep. 30, 2022

(87) PCT Pub. No.: WO2021/204083
PCT Pub. Date: Oct. 14, 2021

(65) Prior Publication Data
US 2023/0156466 A1 May 18, 2023

(30) Foreign Application Priority Data

Apr. 8, 2020 (CN) .......................... 202010268222.7
Oct. 27, 2020 (CN) .......................... 202011167388.6

(51) Int. Cl.
*H04W 12/06* (2021.01)
*H04W 12/043* (2021.01)
*H04W 12/69* (2021.01)

(52) U.S. Cl.
CPC ......... *H04W 12/06* (2013.01); *H04W 12/043* (2021.01); *H04W 12/69* (2021.01)

(58) Field of Classification Search
CPC . H04W 12/041; H04W 12/043; H04W 12/06; H04W 12/009; H04W 12/50;
(Continued)

(56) References Cited

U.S. PATENT DOCUMENTS 10,432,625 B2 10/2019 Kang
10,493,955 B1 * 12/2019 Chen ................ H04W 12/50
(Continued)

FOREIGN PATENT DOCUMENTS

CN 102223231 A 10/2011
CN 106357525 A 1/2017
(Continued)

OTHER PUBLICATIONS

Ortiz-Yepes et al., "BALSA: Bluetooth Low Energy Application Layer Security Add-on" [Online], Feb. 18, 2016[Retrieved on: Jan. 3, 2025], 2015 International Workshop on Secure Internet of Things, Retrieved from: < https://ieeexplore.ieee.org/stamp/stamp.jsp?tp=&arnumber=7411834 > (Year: 2016).*
(Continued)

*Primary Examiner* — Eric W Shepperd
(74) *Attorney, Agent, or Firm* — SLATER MATSIL, LLP

(57) ABSTRACT

The method includes a gateway device sending a first authentication request and a second authentication request to a first device. The gateway device obtains a third authentication request from the first device, where the third authentication request is used by the gateway device to verify the first device based on the first identification code and third authentication information. The gateway device sends a fourth authentication request to the first authentication server. The gateway device obtains first confirmation information, second confirmation information, third confirmation information, and fourth confirmation information, and establishes a communication connection between the first device
(Continued)

and the gateway device based on all the confirmation information.

20 Claims, 19 Drawing Sheets

(58) Field of Classification Search
CPC ...... H04W 12/69; H04L 63/061; H04L 63/08; H04L 63/0869; H04L 63/0876; H04L 63/0884; H04L 63/12
See application file for complete search history.

(56) References Cited

U.S. PATENT DOCUMENTS

| | | | |
|---|---|---|---|
| 11,259,178 B2 | 2/2022 | Hu | |
| 2007/0198837 A1* | 8/2007 | Koodli | H04W 12/0471 713/153 |
| 2009/0287922 A1* | 11/2009 | Herwono | H04L 9/321 380/279 |
| 2013/0145420 A1* | 6/2013 | Ting | H04L 63/08 726/1 |
| 2018/0167812 A1* | 6/2018 | Nagarajamoorthy | H04W 4/80 |
| 2018/0198670 A1* | 7/2018 | Salmela | H04L 63/0876 |
| 2018/0270340 A1* | 9/2018 | Ahmad | H04W 12/069 |
| 2019/0215879 A1* | 7/2019 | Song | G10L 15/22 |
| 2019/0357043 A1* | 11/2019 | Hu | H04L 9/0869 |
| 2020/0036792 A1* | 1/2020 | Palin | H04W 4/80 |
| 2020/0119912 A1* | 4/2020 | Neumann | H04W 12/041 |
| 2020/0169861 A1* | 5/2020 | Hu | H04W 4/80 |
| 2023/0049341 A1* | 2/2023 | Sethi | H04W 12/069 |
| 2025/0008324 A1* | 1/2025 | Barr | H04W 76/11 |

FOREIGN PATENT DOCUMENTS

| | | |
|---|---|---|
| CN | 108616504 A | 10/2018 |
| CN | 110324820 A | 10/2019 |
| CN | 110505606 A | 11/2019 |
| WO | 2021155922 A1 | 8/2021 |

OTHER PUBLICATIONS

Ortiz-Yepes Diego A:"BALSA: Bluetooth Low Energy Application Layer Security Add-on," 2015 International Workshop On Secure Internet of Things (SIOT), IEEE, Sep. 21, 2015 (Sep. 21, 2015), pp. 15-24, XP032866846, DOI: 10.1109/SIOT.2015.12, total 10 pages.

* cited by examiner

BLUETOOTH NETWORKING METHOD FOR ELECTRONIC DEVICE AND RELATED DEVICE

CROSS REFERENCE TO RELATED APPLICATIONS

This application is a national stage of International Application No. PCT/CN2021/085299, filed on Apr. 2, 2021, which claims priority to Chinese Patent Application No. 202010268222.7, filed on Apr. 8, 2020 and Chinese Patent Application No. 202011167388.6, filed on Oct. 27, 2020. All of the aforementioned applications are hereby incorporated by reference in their entireties.

TECHNICAL FIELD

This application relates to the field of networking technologies, and in particular, to a Bluetooth networking method for an electronic device and related devices.

BACKGROUND

A Bluetooth Low Energy mesh (Bluetooth Low Energy Mesh, BLE Mesh) is a networking specification based on Bluetooth BLE 4.0 technologies. The BLE Mesh uses BLE devices as carriers and supports self-organizing device networks.

According to the BLE Mesh specification, smart home devices need to be authenticated before joining a BLE Mesh network. In a smart home scenario of BLE Mesh Bluetooth networking, currently, an authentication server is mainly used to perform validity authentication on a to-be-added smart home device. A smart home device communicates with the authentication server by using a gateway device, and validity authentication is performed on the smart home device. After the smart home device is authenticated, the device may join a BLE Mesh network in which the gateway device is located, and access a network by using the gateway device.

It should be noted that the foregoing authentication manner is mainly authentication between an authentication server and a to-be-joined smart home device. In actual networking, because a user usually does not need to perform verification between a smart home device and a gateway device, the smart home device is likely to be bound to an incorrect gateway. In some cases, authentication may be performed on a to-be-joined first smart home device by an authentication server by using a second gateway device of a neighbor. After the authentication server authenticates the smart home device, the first smart home device and the second gateway device of the neighbor form a BLE Mesh network. After the second gateway device is bound to the first smart home device, the second gateway device may control the first smart home device, and consequently there is a security risk and a privacy problem.

SUMMARY

This application provides a Bluetooth networking method for an electronic device and related devices, to improve networking security of the electronic device.

According to a first aspect, an embodiment of this application provides a Bluetooth networking method for an electronic device, including the following steps:

A gateway device obtains a first identification code of a first device.

The gateway device sends a first authentication request to the first device, and the first authentication request is used by the first device to verify a first authentication server.

The gateway device sends a second authentication request to the first device, the second authentication request includes second authentication information. The second authentication information is generated by the gateway device based on a first identification code, and the second authentication request is used for the first device to verify the gateway device based on the first identification code and the second authentication information.

The gateway device obtains a third authentication request from the first device, the third authentication request includes third authentication information, and the third authentication information is generated by the first device based on the first identification code.

The gateway device verifies the first device based on the first identification code and the third authentication information, to obtain third confirmation information.

The gateway device sends a fourth authentication request to the first authentication server, and the fourth authentication request is used by the first authentication server to verify the first device.

The gateway device obtains first confirmation information and second confirmation information from the first device, and obtains fourth confirmation information from the first authentication server. The first confirmation information includes a result of the authentication performed by the first device on the first authentication server, the second confirmation information includes a result of the authentication performed by the first device on the gateway device, and the fourth confirmation information includes a result of the authentication performed by the first authentication server on the first device.

A communication connection is established between the first device and the gateway device based on the first confirmation information, the second confirmation information, the third confirmation information, and the fourth confirmation information.

In the foregoing solution, verification may be performed between the first device and the gateway device based on the second authentication information and the third authentication information, to implement network access authentication between the gateway device and the first device. Verification may be performed between the first device and the first authentication server based on the first authentication information and the fourth authentication information, to implement network access authentication between the first authentication server and the first device. Therefore, according to the solution in this embodiment of this application, when the first device requests to join a network, near-end confirmation performed by the gateway device on the first device can be implemented on the basis of remote authentication performed by the authentication server on the first device, thereby avoiding incorrect networking of the gateway device and the first device, ensuring that the first device is not incorrectly or maliciously bound, and improving device networking security.

In this embodiment of this application, a user may provide the first identification code to the gateway device in a plurality of manners. Optionally, the user may provide the first identification code of the first device to the gateway device in a voice manner or by using another electronic device (for example, a second device). With reference to the first aspect, in some implementations of the first aspect, that the gateway device obtains the first identification code of the first device includes: the gateway device receives a first message, and the gateway device obtains the first identification code based on the first message. The first message includes a first voice message or a first indication message, and the first indication message is sent by a second device.

With reference to the first aspect, in some implementations of the first aspect, before the gateway device obtains the first identification code of the first device, the method further includes: the gateway device obtains the type information of the first device, and the gateway device plays a second voice message, where the second voice message includes the type information of the first device; alternatively, the gateway device sends a second message to the second device, where the second message includes the type information of the first device.

In this embodiment of this application, after the gateway device obtains the type information of the first device, the gateway device provides the type information of the first device to the user in a voice manner or by using another electronic device (for example, a second device), to notify the user of information about an electronic device (that is, the first device) that currently requests to join the network, thereby improving networking security of an electronic device.

In this embodiment of this application, the first authentication server maintains the type information of the electronic device. When the first device requests to join the network, the gateway device obtains the type information of the first device from the first authentication server based on the identifier of the first device. With reference to the first aspect, in some implementations of the first aspect, that the gateway device obtains the type information of the first device includes: the gateway device sends a device identifier of the first device to the first authentication server, where the device identifier of the first device is obtained by the gateway device from the first device, and the gateway device obtains the type information of the first device from the first authentication server, where the type information of the first device is obtained by the first authentication server based on the device identifier of the first device.

With reference to the first aspect, in some implementations of the first aspect, the second authentication request includes second authentication information, and that the second authentication information is generated by the gateway device based on the first identification code, and the second authentication request is used by the first device to verify the gateway device based on the first identification code and the second authentication information includes:

The second authentication information is generated by the gateway device based on the first identification code and a first random value, the second authentication request is used by the first device to verify the gateway device based on the first identification code, the first random value, and the second authentication information, and the first random value is related to the first authentication server.

Alternatively, the second authentication information is generated by the gateway device based on the first identification code and a first key value, the second authentication request is used by the first device to verify the gateway device based on the first identification code, the first key value, and the second authentication information, and the first key value is related to the first device.

With reference to the first aspect, in some implementations of the first aspect, the third authentication information is generated by the first device based on the first identification code, and that the gateway device verifies the first device based on the first identification code and the third authentication information, to obtain the third confirmation information includes the following step:

The gateway device verifies the first device based on the first identification code, a second random value, and the third authentication information, to obtain the third confirmation information. The third authentication information is generated by the first device based on the first identification code and the second random value, and the second random value is related to the first device.

With reference to the first aspect, in some implementations of the first aspect, the first key value includes one or more of the following: a public key of the first device, a device identifier of the first device, address information of the first device, or a key factor of the first device.

According to a second aspect, an embodiment of this application provides a Bluetooth networking method for an electronic device, including the following steps:

A first device receives a first authentication request sent by a gateway device.

The first device verifies the first authentication server based on the first authentication request to obtain first confirmation information.

The first device receives a second authentication request sent by the gateway device, where the second authentication request includes second authentication information, and the second authentication information is generated by the gateway device based on a first identification code.

The first device verifies the gateway device based on the first identification code and the second authentication information, to obtain second confirmation information.

The first device sends a third authentication request to the gateway device, where the third authentication request includes third authentication information, the third authentication information is generated by the first device based on the first identification code, and the third authentication request is used by the gateway device to verify the first device based on the first identification code and the third authentication information.

The first device sends a fourth authentication request to the gateway device, where the fourth authentication request is sent by the gateway device to the first authentication server, and the fourth authentication request is used by the first authentication server to verify the first device.

The first device sends the first confirmation information and the second confirmation information to the gateway device.

In the foregoing solution, verification may be performed between the first device and the gateway device based on the second authentication information and the third authentication information, to implement network access authentication between the gateway device and the first device. Verification may be performed between the first device and the first authentication server based on the first authentication information and the fourth authentication information, to implement network access authentication between the first authentication server and the first device. Therefore, according to the solution in this embodiment of this application, when an electronic device requests to join a network, authentication may be performed by a gateway device in addition to authentication performed by an authentication server, to improve networking security of the electronic device.

With reference to the second aspect, in some implementations of the second aspect, before the first device receives the first authentication request sent by the gateway device, the method further includes: the first device sends type information of the first device to the gateway device. In this manner, the first device provides the type information of the first device to the gateway device, thereby simplifying a step in which the gateway device obtains the type information of the first device. Alternatively, the first device sends a device identifier of the first device to the gateway device, where the device identifier is used to indicate the gateway device to obtain the type information of the first device based on the device identifier. In this manner, the first authentication server maintains the type information of the electronic device. When the first device requests to join the network, the gateway device obtains the type information of the first device from the first authentication server based on the identifier of the first device, thereby implementing centralized management of the electronic devices.

With reference to the second aspect, in some implementations of the second aspect, that the second authentication information is generated by the gateway device based on a first identification code, and the first device verifies the gateway device based on the first identification code and the second authentication information to obtain second confirmation information includes the following step:

The first device verifies the gateway device based on the first identification code, a first random value, and the second authentication information, where the second authentication information is generated by the gateway device based on the first identification code and the first random value, and the first random value is related to the first authentication server.

Alternatively, the first device verifies the gateway device based on the first identification code, a first key value, and the second authentication information, where the second authentication information is generated by the gateway device based on the first identification code and the first key value, and the first key value is related to the first device.

With reference to the second aspect, in some implementations of the second aspect, the third authentication request includes third authentication information, and that the third authentication information is generated by the first device based on the first identification code, and the third authentication request is used by the gateway device to verify the first device based on the first identification code and the third authentication information includes:

The third authentication information is generated by the first device based on the first identification code and a second random value, the third authentication request is used by the gateway device to verify the first device based on the first identification code, the second random value, and the third authentication information, and the second random value is related to the first device.

With reference to the second aspect, in some implementations of the second aspect, the first key value is a public key of the first device; or the first key value includes one or more of the following: the device identifier of the first device, address information of the first device, or a key factor of the first device.

According to a third aspect, an embodiment of this application provides a Bluetooth networking method for an electronic device, including the following steps:

A first authentication server receives a fourth authentication request sent by a gateway device, where the fourth authentication request includes fourth authentication information, the fourth authentication information is generated by a first device based on a first key value, and the first key value is related to the first device.

The first authentication server verifies the first device based on the first key value and the fourth authentication request, to obtain fourth confirmation information.

The first authentication server sends the fourth confirmation information to the gateway device.

With reference to the third aspect, in some implementations of the third aspect, the method further includes the following steps:

The first authentication server sends first authentication information to the gateway device, where the first authentication information is generated by the first authentication server based on a first key value. The gateway device sends a first authentication request to the first device based on the first authentication information, where the first authentication request is used by the first device to verify the first authentication server based on the first key value and the first authentication information.

Alternatively, the first authentication server sends first authentication information to the gateway device, where the first authentication information is generated by the first authentication server based on a first key value and a first random value. The gateway device sends a first authentication request to the first device based on the first authentication information, where the first authentication request is used by the first device to verify the first authentication server based on the first key value, the first random value, and the first authentication information, and the first random value is related to the first authentication server.

Alternatively, the first authentication server sends first authentication information to the gateway device, where the first authentication information is generated by the first authentication server based on a first key value, a second key value, and a first random value. The gateway device sends a first authentication request to the first device based on the first authentication information, where the first authentication request is used by the first device to verify the first authentication server based on the first key value, the second key value, and the first authentication information, and the second key value is related to the first device.

With reference to the third aspect, in some implementations of the third aspect, that the fourth authentication information is generated by the first device based on the first key value, and the first authentication server verifies the first device based on the first key value and the fourth authentication request, to obtain fourth confirmation information includes the following step:

The fourth authentication information is generated by the first device based on the first key value and the second random value, the first authentication server verifies the first device based on the first key value, the second random value, and the fourth authentication information, to obtain fourth confirmation information, and the second random value is related to the first device.

Alternatively, the fourth authentication information is generated by the first device based on the first key value, the second key value, and a second random value, the first authentication server verifies the first device based on the first key value, the second key value, and the second random value to obtain fourth confirmation information, and the second key value and the second random value are related to the first device.

With reference to the third aspect, in some implementations of the third aspect, the first key value is a public key of the first device; or the first key value includes one or more of the following: a device identifier of the first device, address information of the first device, or a key factor of the first device.

With reference to the third aspect, in some implementations of the third aspect, the second key value is generated based on one or more of the device identifier of the first device, the address information of the first device, or the key factor of the first device.

According to a fourth aspect, an embodiment of this application provides a Bluetooth networking method for an electronic device, including the following steps:

A gateway device obtains a first identification code of a first device.

The gateway device sends a first authentication request to the first device, and the first device verifies a first authentication server based on the first authentication request to obtain first confirmation information.

The gateway device sends a second authentication request to the first device, where the second authentication request includes second authentication information, the second authentication information is generated by the gateway device based on the first identification code, and the first device verifies the gateway device based on the first identification code and the second authentication information to obtain second confirmation information.

The gateway device obtains a third authentication request from the first device, where the third authentication request includes third authentication information, and the third authentication information is generated by the first device based on the first identification code, and the gateway device verifies the first device based on the first identification code and the third authentication information, to obtain third confirmation information.

The gateway device sends a fourth authentication request to the first authentication server, and the first authentication server verifies the first device based on a first key value and the fourth authentication request to obtain fourth confirmation information.

The gateway device obtains the first confirmation information and the second confirmation information from the first device, and obtains the fourth confirmation information from the first authentication server. The first confirmation information includes a result of the authentication performed by the first device on the first authentication server, the second confirmation information includes a result of the authentication performed by the first device on the gateway device, and the fourth confirmation information includes a result of the authentication performed by the first authentication server on the first device.

A communication connection is established between the first device and the gateway device based on the first confirmation information, the second confirmation information, the third confirmation information, and the fourth confirmation information.

With reference to the fourth aspect, in some implementations of the fourth aspect, the method further includes the following steps:

The gateway device obtains a device identifier of the first device from the first device.

The gateway device sends the device identifier of the first device to the first authentication server.

The first authentication server obtains type information of the first device based on the device identifier of the first device.

The first authentication server sends the type information of the first device to the gateway device.

With reference to the fourth aspect, in some implementations of the fourth aspect, that the first authentication server obtains the type information of the first device based on the device identifier of the first device includes the following steps:

The first authentication server sends the device identifier of the first device to a second authentication server, where the second authentication server is associated with the first device.

The second authentication server sends the type information of the first device to the first authentication server, where the type information of the first device is obtained by the second authentication server based on the device identifier of the first device.

With reference to the fourth aspect, in some implementations of the fourth aspect, before the first authentication server sends the device identifier of the first device to the second authentication server, the method further includes the following steps:

The first authentication server sends the device identifier of the first device to a server management module.

The server management module determines the second authentication server based on the device identifier of the first device.

The server management module sends information about the second authentication server to the first authentication server.

With reference to the fourth aspect, in some implementations of the fourth aspect, that the gateway device sends the first authentication request to the first device, and the first device verifies the first authentication server based on the first authentication request, to obtain first confirmation information includes the following steps:

The gateway device sends the first key value to the first authentication server.

The first authentication server generates the first authentication information based on the first key value, and sends the first authentication information to the gateway device.

The gateway device sends the first authentication request to the first device, where the first authentication request includes the first authentication information.

The first device verifies the first authentication server based on the first key value and the first authentication information, to obtain the first confirmation information.

Alternatively, the gateway device sends the first key value to the first authentication server.

The first authentication server generates the first authentication information based on the first key value and a first random value, and sends the first authentication information to the gateway device, where the first random value is related to the first authentication server.

The gateway device sends the first authentication request and the first random value to the first device, where the first authentication request includes the first authentication information.

The first device verifies the first authentication server based on the first key value, the first random value, and the first authentication information, to obtain the first confirmation information.

Alternatively, the gateway device sends the first key value to the first authentication server.

The first authentication server generates the first authentication information based on the first key value, a second key value, and a first random value, and sends the first authentication information to the gateway device, where the second key value is generated based on information about the first device, and the first random value is related to the first authentication server.

The gateway device sends the first authentication request and the first random value to the first device, where the first authentication request includes the first authentication information.

The first device verifies the first authentication server based on the first key value, the first random value, and the first authentication information, to obtain the first confirmation information.

With reference to the fourth aspect, in some implementations of the fourth aspect, that the gateway device sends the fourth authentication request to the first authentication server, and the first authentication server verifies the first device based on the first key value and the fourth authentication request to obtain the fourth confirmation information includes the following steps:

The first device sends fourth authentication information to the gateway device, where the fourth authentication information is generated by the first device based on the first key value, and the first key value is related to the first device.

The gateway device sends the fourth authentication request to the first authentication server, where the fourth authentication request includes the fourth authentication information.

The first authentication server verifies the first device based on the first key value and the fourth authentication information, to obtain the fourth confirmation information.

Alternatively, the first device sends fourth authentication information to the gateway device, where the fourth authentication information is generated by the first device based on the first key value and a second random value, and the first key value and the second random value are related to the first device.

The gateway device sends the fourth authentication request to the first authentication server, where the fourth authentication request includes the fourth authentication information and the second random value.

The first authentication server verifies the first device based on the first key value, the second random value, and the fourth authentication information, to obtain the fourth confirmation information.

Alternatively, the first device sends fourth authentication information to the gateway device, where the fourth authentication information is generated by the first device based on the first key value, a second key value, and a second random value, and the first key value, the second key value, and the second random value are related to the first device.

The gateway device sends the fourth authentication request to the first authentication server, where the fourth authentication request includes the fourth authentication information and the second random value.

The first authentication server verifies the first device based on the first key value, the second key value, the second random value, and the fourth authentication information, to obtain the fourth confirmation information.

With reference to the fourth aspect, in some implementations of the fourth aspect, the first key value is a public key of the first device; or the first key value includes one or more of the following: the device identifier of the first device, address information of the first device, or a key factor of the first device.

With reference to the fourth aspect, in some implementations of the fourth aspect, the second key value is generated based on one or more of the device identifier of the first device, the address information of the first device, or the key factor of the first device.

According to a fifth aspect, an embodiment of this application provides a gateway device, including a first receiving module, a first sending module, and a first processing module.

The first receiving module is configured to obtain a first identification code of a first device.

The first sending module is configured to send a first authentication request to the first device, and the first authentication request is used by the first device to verify a first authentication server.

The first sending module is further configured to send a second authentication request to the first device, the second authentication request includes second authentication information, and the second authentication information is generated by the first processing module based on the first identification code. The second authentication request is used for the first device to verify the gateway device based on the first identification code and the second authentication information.

The first receiving module is further configured to obtain a third authentication request from the first device, where the third authentication request includes third authentication information, and the third authentication information is generated by the first device based on the first identification code.

The first processing module is further configured to verify the first device based on the first identification code and the third authentication information, to obtain third confirmation information.

The first sending module is further configured to send a fourth authentication request to the first authentication server, and the fourth authentication request is used by the first authentication server to verify the first device.

The first receiving module is further configured to obtain first confirmation information and second confirmation information from the first device, and obtain fourth confirmation information from the first authentication server. The first confirmation information includes a result of the authentication performed by the first device on the first authentication server, the second confirmation information includes a result of the authentication performed by the first device on the gateway device, and the fourth confirmation information includes a result of the authentication performed by the first authentication server on the first device.

The first processing module is further configured to establish a communication connection between the first device and the gateway device based on the first confirmation information, the second confirmation information, the third confirmation information, and the fourth confirmation information.

According to a sixth aspect, an embodiment of this application provides a gateway device, including: one or more processors and a memory, where the processor is coupled to the memory, the memory stores one or more computer programs, the one or more computer programs include instructions, and when the instructions are executed by the electronic device, the electronic device is enabled to perform the method according to any one of the first aspect or the possible implementations of the first aspect.

According to a seventh aspect, an embodiment of this application provides an electronic device, including a second receiving module, a second sending module, and a second processing module.

The second receiving module is configured to receive a first authentication request sent by a gateway device.

The second processing module is configured to verify the first authentication server based on the first authentication request, to obtain first confirmation information.

The second receiving module is further configured to receive a second authentication request sent by the gateway device, the second authentication request includes second authentication information, and the second authentication information is generated by the gateway device based on a first identification code.

The second processing module is further configured to verify the gateway device based on the first identification code and the second authentication information, to obtain second confirmation information.

The second sending module is configured to send a third authentication request to the gateway device, where the third authentication request includes third authentication information, the third authentication information is generated by the first device based on the first identification code, and the third authentication request is used by the gateway device to verify the first device based on the first identification code and the third authentication information.

The second sending module is further configured to send a fourth authentication request to the gateway device, the fourth authentication request is sent by the gateway device to the first authentication server, and the fourth authentication request is used for the first authentication server to verify the first device.

The second sending module is further configured to send the first confirmation information and the second confirmation information to the gateway device.

According to an eighth aspect, an embodiment of this application provides an electronic device, including one or more processors and a memory, where the processor is coupled to the memory, the memory stores one or more computer programs, the one or more computer programs include instructions, and when the instructions are executed by the electronic device, the electronic device is enabled to perform the method according to any one of the second aspect or the possible implementations of the second aspect.

According to a ninth aspect, an embodiment of this application provides an authentication server, including a third receiving module, a third sending module, and a third processing module.

The third receiving module is configured to receive a fourth authentication request sent by a gateway device, where the fourth authentication request includes fourth authentication information, the fourth authentication information is generated by a first device based on a first key value, and the first key value is related to the first device.

The third processing module is configured to verify the first device based on the first key value and the fourth authentication request to obtain fourth confirmation information.

The third sending module is configured to send the fourth confirmation information to the gateway device.

According to a tenth aspect, an embodiment of this application provides an authentication server including one or more processors and a memory. The processor is coupled to the memory, the memory stores one or more computer programs, the one or more computer programs include instructions, and when the instructions are executed by the electronic device, the electronic device is enabled to perform the method in any one of the third aspect or the possible implementations of the third aspect.

According to an eleventh aspect, an embodiment of this application provides a computer storage medium including computer instructions. The computer storage medium stores a computer program, and the computer program includes program instructions. When the program instructions are executed by a processor, the processor is enabled to perform the method according to any one of the first aspect, the second aspect, the third aspect, or the possible implementations of the first aspect to the third aspect; or, when the program instructions are executed by a processor, the processor is enabled to perform the method according to any one of the fourth aspect or the possible implementations of the fourth aspect.

In the foregoing solution, when the first device requests to join a network, an authentication process between the first device and the gateway device is implemented in addition to authentication performed by the first device and the authentication server, so that near-end confirmation of the gateway device is implemented on the basis of remote authentication performed by the authentication server. In this way, incorrect networking of the gateway device and the first device can be avoided, it is ensured that the first device is not incorrectly or maliciously bound, and device networking security is improved.

DETAILED DESCRIPTION OF ILLUSTRATIVE EMBODIMENTS

The following describes the technical solutions in embodiments of this application with reference to the accompanying drawings in embodiments of this application. In description in embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments of this application, unless otherwise stated, "a plurality of" means two or more than two.

Figure 1:
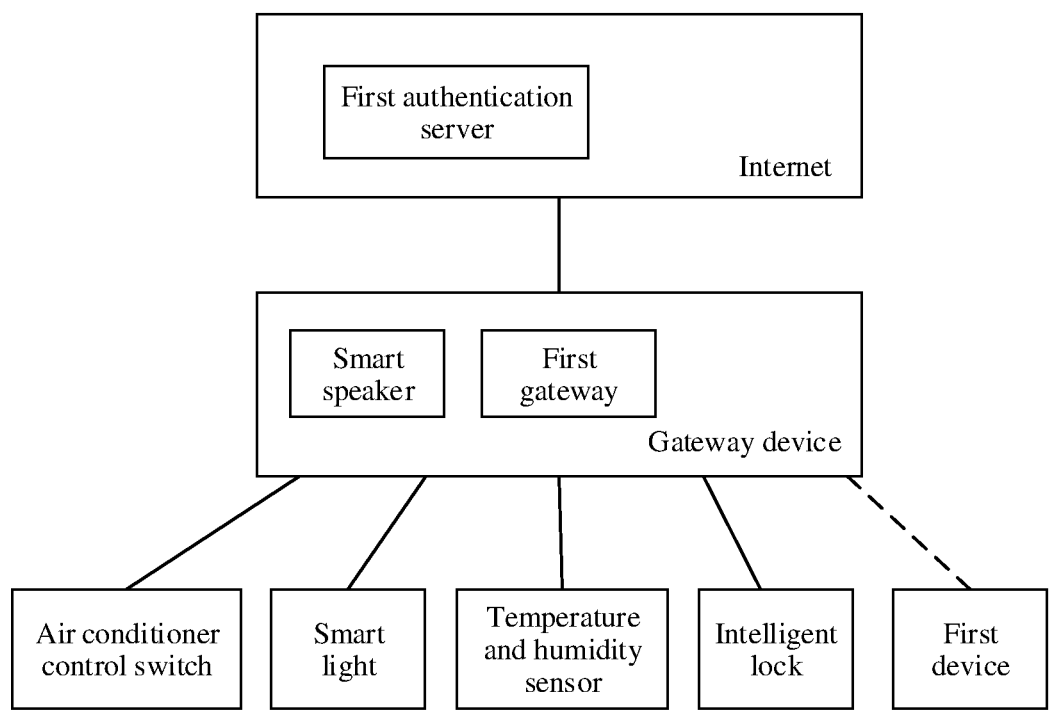
FIG. 1 is a topology diagram of a BleMesh network according to an embodiment of this application.

FIG. 1 is a topology diagram of a BleMesh network according to an embodiment of this application. As shown in FIG. 1, the BleMesh network includes client nodes, and the client nodes may include, for example, an air conditioner control switch, a smart light, a temperature and humidity sensor, an intelligent lock, or the like. The client node may access the Internet by using a gateway device. A plurality of gateways may be deployed in the BleMesh network, and message forwarding and relay transmission may be supported between the plurality of gateways. As shown in FIG. 1, the gateway device includes a first gateway and a smart speaker. The first gateway is a device dedicated to implement a gateway function. In addition to a dedicated gateway, the BleMesh network may further include a non-dedicated gateway. The non-dedicated gateway can implement an additional function in addition to the gateway function. For example, the smart speaker shown in FIG. 1 supports a BleMesh protocol and can function as a gateway, and can also implement a speaker function. Certainly, in actual network deployment, another dedicated gateway or another non-dedicated gateway may be further deployed. Examples are not enumerated herein. In the BleMesh network, the client node may select a nearby gateway to access the Internet. For example, the first gateway is deployed on the first floor of a house, and the smart speaker is deployed on the second floor of the house. In this case, client nodes such as a smart light, an intelligent lock, and an air conditioner control switch that are on the first floor of the house may access the Internet by using the first gateway, and client nodes such as a smart light, an intelligent lock, and a temperature and humidity sensor that are on the second floor of the house may access the Internet by using the smart speaker. In an example, message forwarding and relay transmission are supported between the first gateway and the smart speaker. For example, the smart speaker is connected to the first gateway, the first gateway is connected to the Internet, and the smart speaker may access the Internet by using the first gateway.

New devices can be added to the BleMesh network. As shown in FIG. 1, the first device is a new device that is to join the BleMesh network. Before the first device joins the BleMesh network, network access configuration needs to be performed on the new device. After the network access configuration succeeds, the first device becomes a trusted client node in the BleMesh network. When the BleMesh network includes the plurality of gateways, the first device may communicate with a first authentication server by using a nearby gateway, for the network access configuration.

Figure 2:
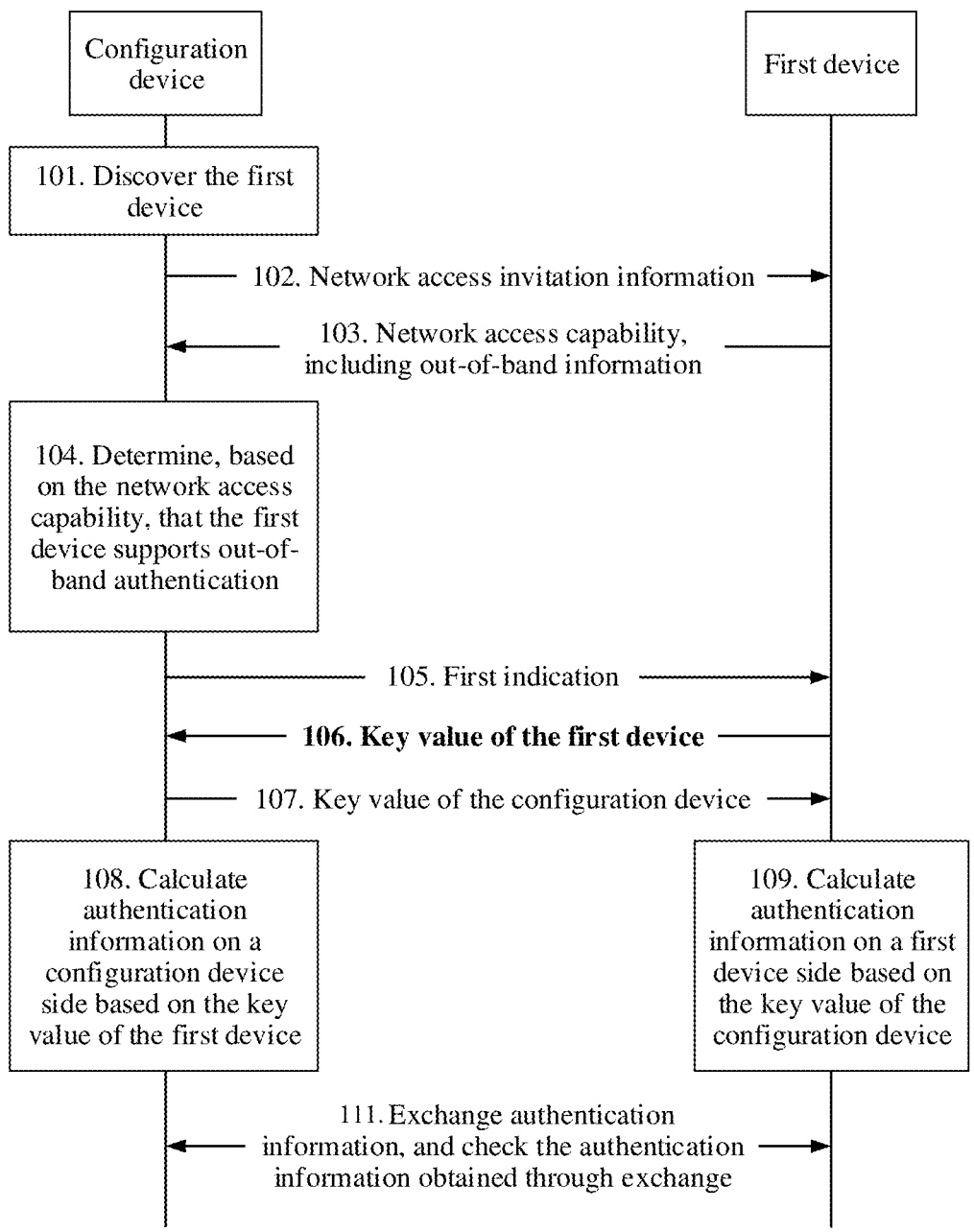
FIG. 2 is a flowchart of a Bluetooth networking method for an electronic device according to a related technology.

FIG. 2 is a flowchart of a Bluetooth networking method for an electronic device according to a related technology. In the method shown in FIG. 2, a configuration device and a first device are used as an example. The configuration device implements functions of the first authentication server and the gateway device that are shown in FIG. 1. As shown in FIG. 2, main steps for the first device to join the BleMesh network include:

101. The configuration device discovers the first device. In some embodiments, the configuration device may actively send a network access invitation broadcast signal. After detecting the network access invitation broadcast signal through scanning, the first device sends a feedback signal to the configuration device. The feedback signal may include information such as an identifier of the first device. In some embodiments, the first device may actively initiate a network access broadcast. The network access broadcast includes the device identifier of the first device. The configuration device discovers the first device by scanning the network access broadcast. In some embodiments, the configuration device may receive network access indication information entered by a user. The network access indication information may include the identifier of the first device. In this way, the configuration device may discover the first device based on the network access indication information. In some other embodiments, the configuration device logs in to a first account, and the configuration device determines another device of the first account as the first device to be added to the network. Certainly, the configurator may also discover the first device in other manners. This is not enumerated herein.

102. The configuration device sends network access invitation information to the first device.

103. The first device sends a network access capability to the configuration device after receiving the network access invitation information. Optionally, the network access capability includes out-of-band (Out-Of-Band, OOB) information. If the first device does not support OOB out-of-band authentication, the network access capability may feedback information indicating that OOB authentication is not supported. An OOB transfer protocol uses a channel different from a common data channel to transfer important or urgent data. For example, a socket mechanism of a Linux system supports sending and receiving of out-of-band data by using a lower-layer protocol. A Transmission Control Protocol (Transmission Control Protocol, TCP) does not have a real out-of-band data protocol. To support out-of-band data transfer, the TCP provides an urgent mode (urgent mode) mechanism. In the TCP protocol, an urgent (Urgent, URG) bit is set in a data segment, indicating that an urgent mode is entered. A sender and a receiver may transfer corresponding data in the emergency mode.

104. The configuration device determines, based on the network access capability of the first device, that the first device supports the OOB authentication. Then, step 105 is performed.

105. The configuration device sends a first indication to the first device, and the first indication is used to indicate the first device to provide a key value for performing the out-of-band authentication.

106. After receiving the first indication, the first device provides a key value of the first device to the configuration device. Optionally, the first device may provide the key value of the first device to the configuration device by using a light wave signal, a sound signal, code scanning, or the like.

107. After receiving the key value sent by the first device, the configuration device provides a key value of the configuration device to the first device.

108. The configuration device calculates authentication information on a configuration device side based on the key value of the first device.

109. The first device calculates authentication information on a first device side based on the key value of the configuration device.

111. The first device exchanges authentication information with the configuration device, and verifies the authentication information obtained through exchange. Optionally, the first device verifies the authentication information on the configuration device side based on the key value of the first device, to obtain a first verification result. The configuration device verifies the authentication information on the first device side based on the key value of the configuration device, to obtain a second verification result. If both of the first verification result and the second verification result indicate that the verification succeeds, the configuration device determines that the first device joins the network, and distributes network access configuration data to the first device.

Figure 3A:
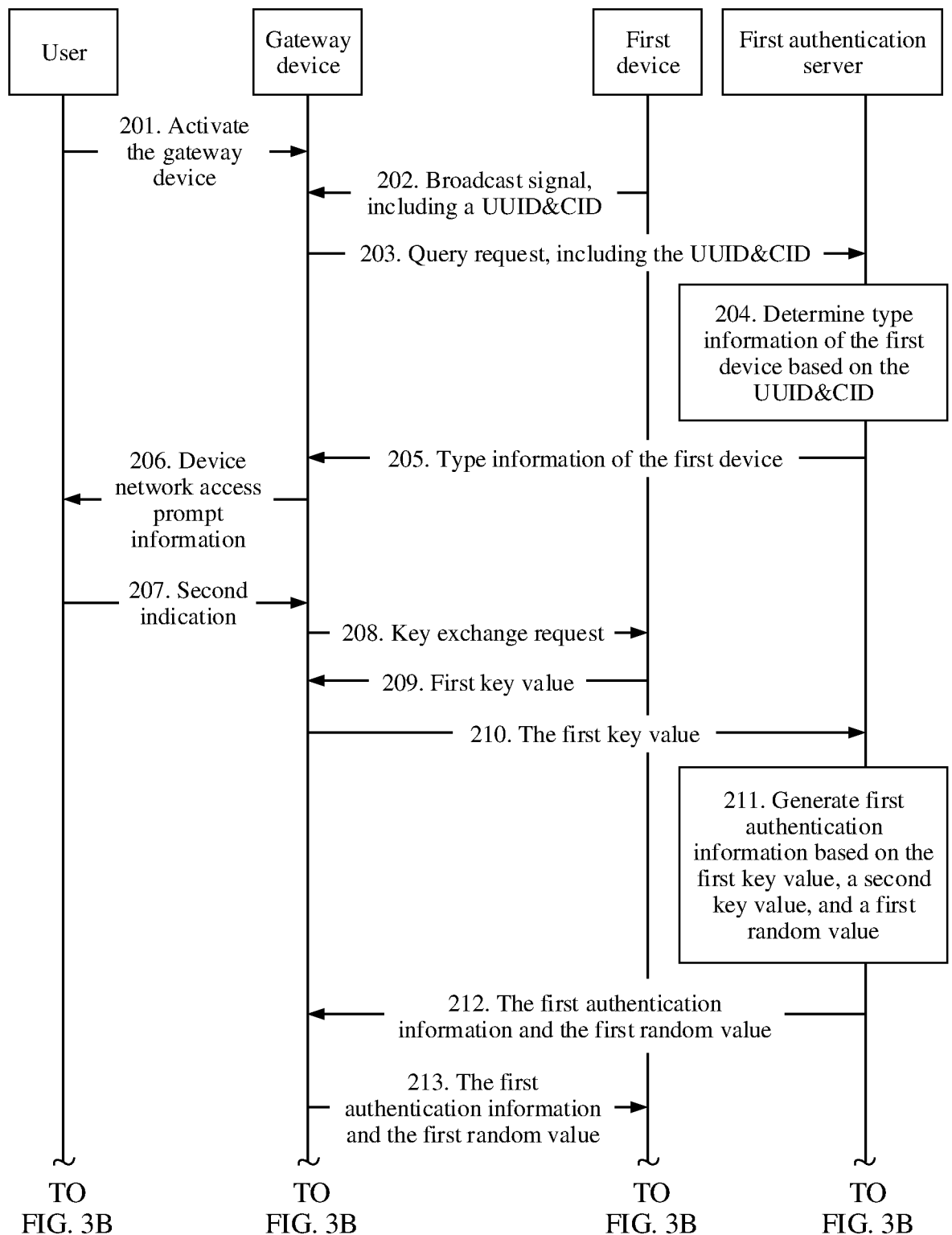
FIG. 3A and FIG. 3B are a flowchart of a Bluetooth networking method for an electronic device according to an embodiment of this application.
Figure 3B:
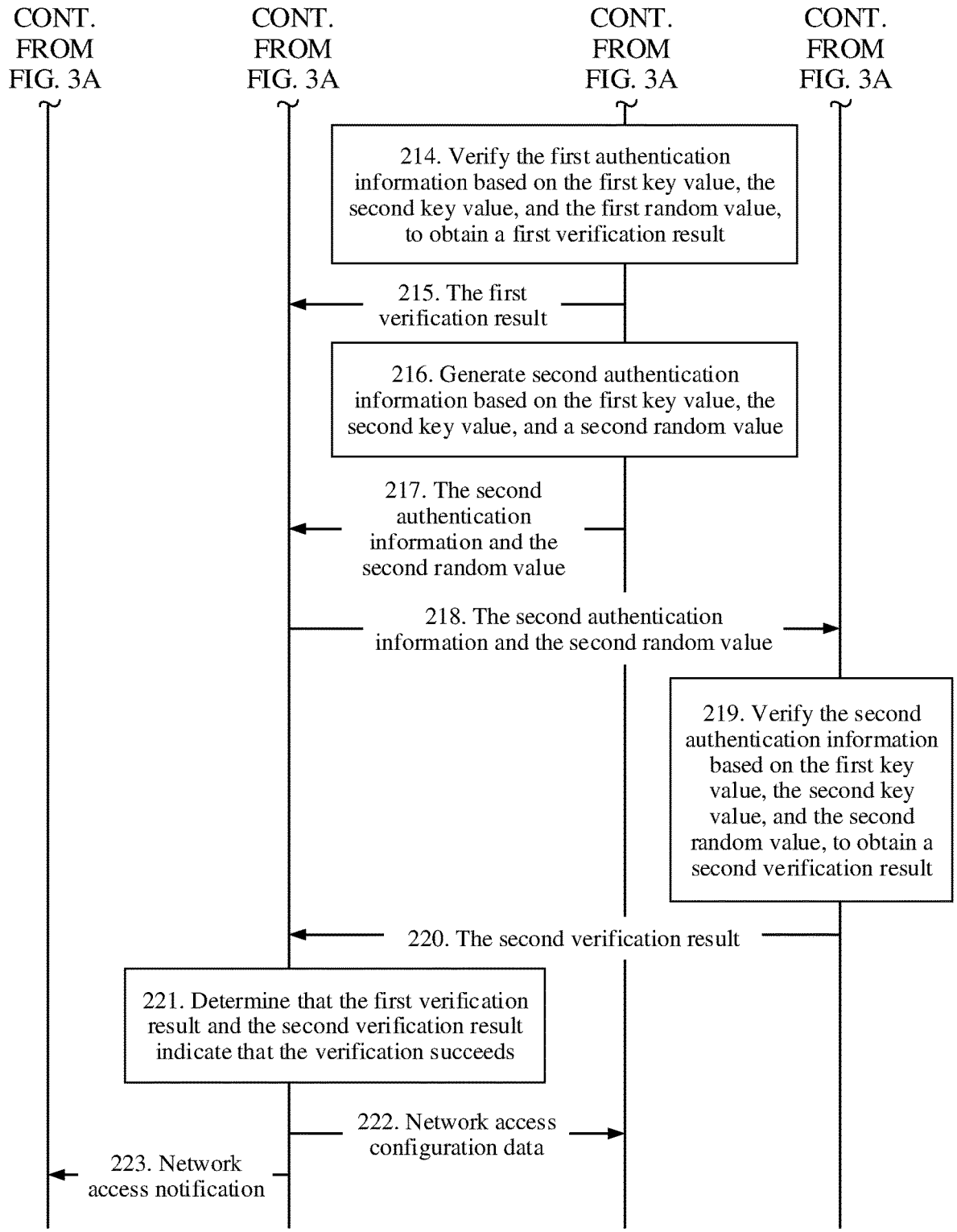

It should be noted that FIG. 2 shows only main processing steps of device network access authentication. In some embodiments, based on the network topology shown in FIG. 1, a gateway device performs steps of device discovery and configuration data distribution, and a first authentication server performs steps of device verification. As shown in FIG. 3A and FIG. 3B, network access authentication collaboratively performed by a gateway device and a first authentication server on a first device includes the following steps.

201. A user activates the gateway device. In some embodiments, the gateway device includes an active state and a non-active state. When the gateway is in the active state, the gateway device can discover and authenticate a new device. In the non-active state, the gateway device does not perform discovery and authentication processes for the new device. In some embodiments, the gateway device may not distinguish between the active state and the non-active state, and the gateway device may actively discover the new device.

Activating the gateway device by a user means that the user enables the gateway device to enter the active state. Optionally, the user may activate the gateway device by using a voice or a second device, and the second device may be, for example, a mobile phone of the user. The user activating the gateway device by using the voice may be that the user sends a voice signal to the gateway device. The gateway device identifies an activation instruction from the voice signal. The gateway device starts scanning for a network access broadcast signal according to the activation instruction. The user activating the gateway device by using the second device may be that the user sends an activation instruction to the gateway device by using the second device. The gateway device start scanning for a network access broadcast signal according to the received activation instruction. In some embodiments, the user may scan a two-dimensional code on the gateway device by using an application on the second device. By scanning the two-dimensional code on the device, the gateway device is activated to start scanning for the network access broadcast signal.

202. The first device sends a broadcast signal. Optionally, the broadcast signal is a Bluetooth broadcast signal.

In some embodiments, the broadcast signal may include a universally unique identifier (Universally Unique Identifier, UUID). Optionally, in addition to the UUID, the broadcast signal may further include a company identity (Company Identity, CID). In the example shown in FIG. 3 and FIG. 3B, the broadcast signal includes a UUID and a CID.

203. The gateway device sends a query request to the first authentication server. Optionally, the query request includes the UUID and the CID.

204. The first authentication server determines type information of the first device based on the query request. Optionally, the first authentication server stores a device identifier (for example, a UUID and a CID of the device) and the type information of the device. The first authentication server may determine the type information of the first device based on the UUID and the CID of the first device. The first authentication server may determine, based on the UUID and the CID of the first device, that a device type of the first device that currently requests to join the network is a desk lamp, a television, a sound box, or the like.

205. The first authentication server sends the type information of the first device to the gateway device. After determining the type information of the first device based on the query request, the first authentication server sends the device type information to the gateway device.

206. The gateway device sends device network access prompt information to the user.

The gateway device may send the device network access prompt information to the user in the following manner: The gateway device prompts the user in a voice manner that the first device requests to join a first network. For example, a device type, a name, and the like of the current first device may be played by using a voice. Optionally, the gateway device may further query, in a voice manner, the user whether the first device is allowed to join the first network. If the user allows the first device to john the first network, the user may send a second indication to the gateway device in a voice manner, and the second indication is used to indicate the gateway device to allow the first device to access the first network. In some embodiments, the gateway device may alternatively send the device network access prompt information to the user in the following manner: The gateway device sends the network access prompt information to a second device (for example, a mobile phone). For example, the gateway device sends, to a specified application, information indicating that the first device requests to join the first network. The user enters the second indication by using the specified application, to indicate the gateway device to allow the first device to access the first network.

207. The user sends a second indication to the gateway device, and the second indication indicates the first device to join the first network by using the gateway device. In this case, the gateway device is not specified, and the gateway device may be any gateway device that can be connected to the first device.

208. The gateway device sends a key exchange request to the first device.

209. The first device sends a first key value to the gateway device based on the key exchange request.

210. The gateway device sends the first key value to the first authentication server.

211. The first authentication server generates first authentication information based on the first key value, a second key value, and a first random value. The first key value and the second key value may be different key values. The second key value may be generated based on information about the first device. The first random value is a random sequence generated by the first authentication server.

212. The first authentication server sends the first authentication information and the first random value to the gateway device.

213. The gateway device sends the first authentication information and the first random value to the first device.

214. The first device verifies the first authentication information based on the first key value, the second key value, and the first random value, to obtain a first verification result.

215. The first device sends the first verification result to the gateway device.

216. The first device generates second authentication information based on the first key value, the second key value, and a second random value. The second random value may be the first random sequence randomly generated by the first device. Optionally, the second random value is different from the first random value.

217. The first device sends the second authentication information and the second random value to the gateway device.

218. The gateway device sends the second authentication information and the second random value to the first authentication server.

219. The first authentication server verifies the second authentication information based on the first key value, the second key value, and the second random value, to obtain a second verification result.

220. The first authentication server sends the second verification result to the gateway device.

221. The gateway device determines that the first verification result and the second verification result indicate that the verification succeeds. Then, the gateway device performs step 222 and step 223. If either the first verification result or the second verification result indicates that the verification fails, the gateway device determines that the first device fails to access the network, and the gateway device does not establish a communication connection to the first device.

222. The gateway device sends network access configuration data to the first device.

223. The gateway device sends a network access notification to the user.

In this embodiment of this application, verification is performed between the first device and the first authentication server based on verification information that is generated based on the first key value and the second key value, to implement authentication between the first authentication server and the first device.

The foregoing step 201 to step 205 are a device discovery process. In some embodiments, the device discovery process may alternatively be that the gateway device may be set to automatically scan for a new device at a specified time, and the activation step of step 201 is not required. In some embodiments, the gateway device may actively send a network access invitation broadcast signal. After detecting the network access invitation broadcast signal through scanning, the first device sends a feedback signal to the configuration device. The feedback signal may include information such as an identifier of the first device. In some embodiments, the broadcast signal or the feedback signal sent by the first device to the gateway device may further include type information of the device. In this case, the gateway device may directly provide the user with the device network access prompt information, and does not need to query the type information of the first device from the first authentication server.

In some embodiments, the first key value provided by the first device may be a public key of the first device. The first authentication server generating the first authentication information based on the public key of the first device may be encrypting data by using the public key of the first device. Correspondingly, the first device verifying the first authentication information based on the first key value includes performing the verification by using a private key value of the first device.

In some embodiments, the first authentication information and the first random value in step 212 and step 213 may be sent in same information, or may be separately sent in different information, and a sending sequence of the first authentication information and the first random value may be adjusted based on an actual requirement. Similarly, the second authentication information and the second random value in step 217 and step 218 may be sent in same information, or may be separately sent in different information. In addition, a sending sequence of the second authentication information and the second random value may be adjusted based on an actual requirement.

In some embodiments, a sequence of step 210 to step 220 may be adjusted based on an actual requirement. For example, after step 213 is performed, step 216 and step 217 are performed. Then, step 214 and step 215 are performed. Other possible adjusted sequences are not enumerated herein.

In some embodiments, the first verification result and the second verification result may alternatively be provided in an implicit manner. For example, the first device verifies the first authentication information to obtain the first verification result. If the first verification result indicates that the verification succeeds, the second authentication information is sent to the gateway device. If the gateway device does not receive the second authentication information within a preset time period, it may be determined that the first verification result indicates that the verification fails. Other possible combination manners of the steps shown in FIG. 3A and FIG. 3B are not enumerated herein.

Figure 4A:
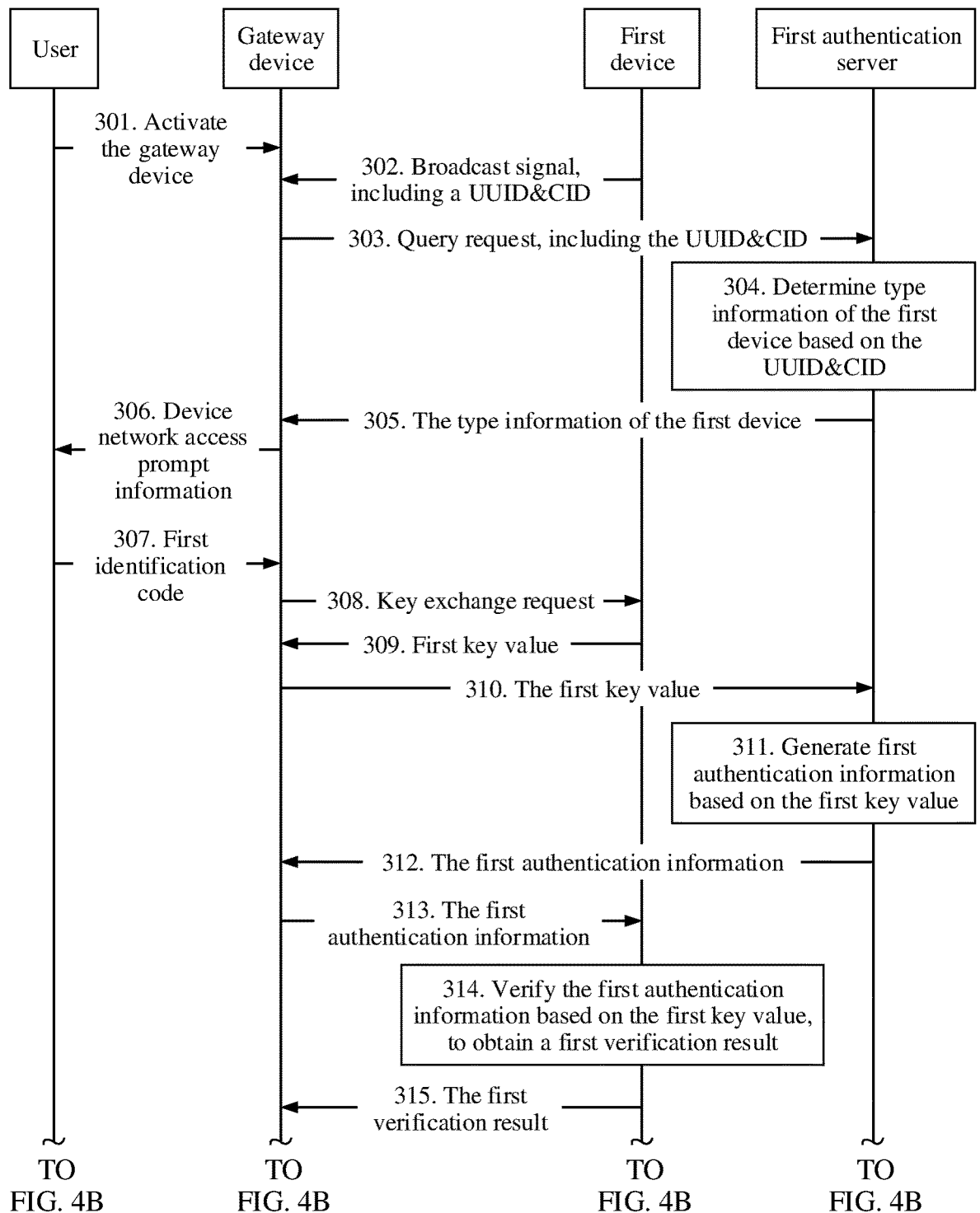
FIG. 4A and FIG. 4B are a flowchart of a Bluetooth networking method for an electronic device according to an embodiment of this application.
Figure 4B:
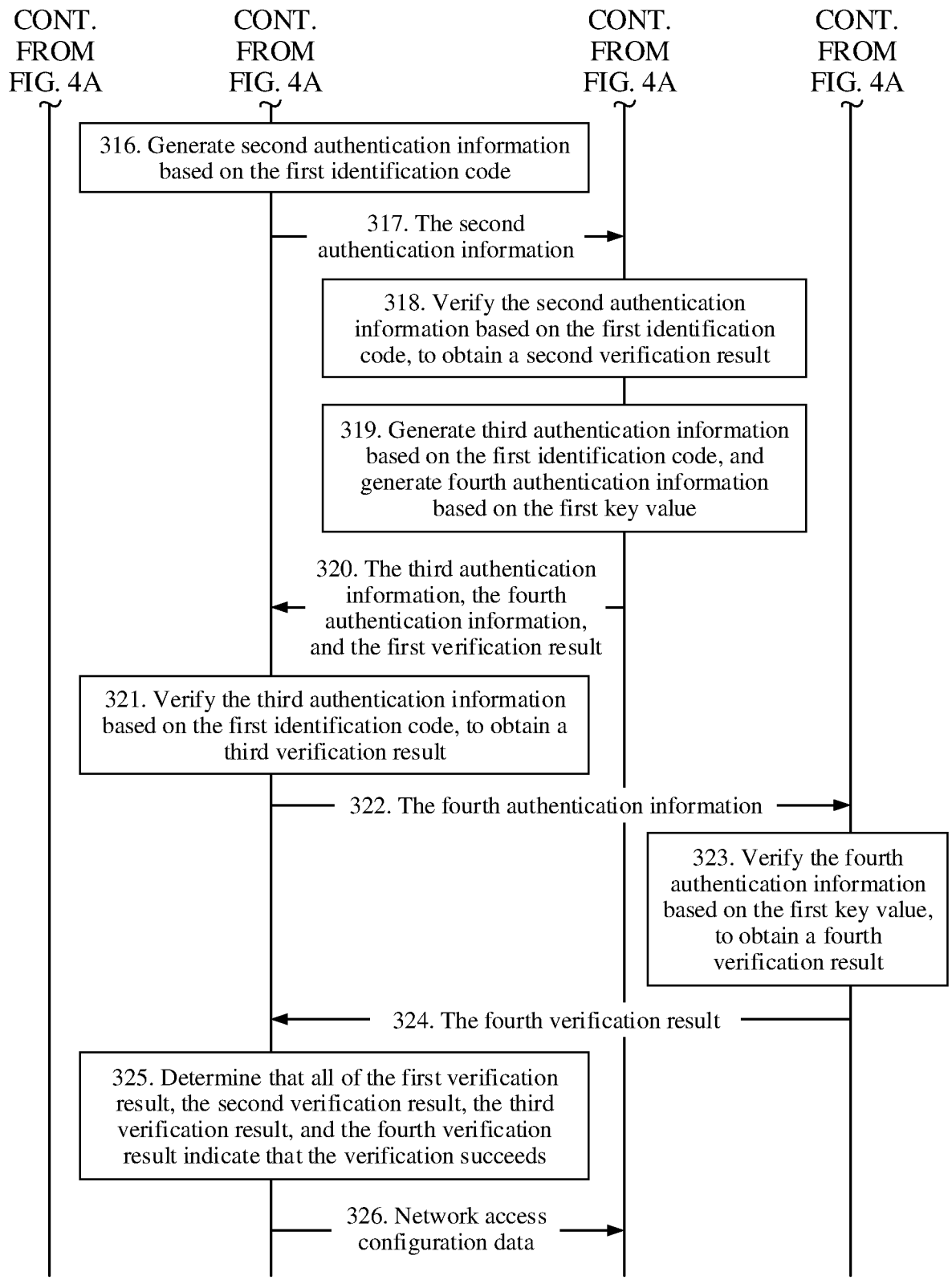

FIG. 4A and FIG. 4B are a flowchart of a Bluetooth networking method for an electronic device according to an embodiment of this application. In this embodiment, when a first device requests to join the network, an authentication procedure between the first device and a gateway device is modified, so that near-end confirmation of the device is further implemented on the basis of remote authentication. As shown in FIG. 4A and FIG. 4B, the method includes the following processing steps.

301. A user activates the gateway device. For specific steps, reference may be made to the description of step 201 in FIG. 3A. Details are not described herein again.

302. The first device sends a broadcast signal. Optionally, the broadcast signal may be a Bluetooth broadcast signal.

In some embodiments, the broadcast signal may include a UUID. Optionally, in addition to the UUID, the broadcast signal may further include a company identity (Company Identity, CID). In the example shown in FIG. 4A and FIG. 4B, the broadcast signal includes the UUID and the CID.

303. The gateway device sends a query request to a first authentication server. Optionally, the query request includes the UUID and the CID.

304. The first authentication server determines type information of the first device based on the query request. Optionally, the first authentication server may determine the type information of the first device based on the UUID and the CID of the first device. The first authentication server may determine, based on the UUID and the CID of the first device, that the device type of the first device that currently requests to join the network is a desk lamp, a television, a sound box, or the like.

305. The first authentication server sends the type information of the first device to the gateway device. After the first authentication server determines the type information of the first device based on the query request, the first authentication server sends the type information of the first device to the gateway device. Optionally, in addition to sending the type information of the first device, the first authentication server further sends prompt information that near-end confirmation is required for the device to access the network.

306. The gateway device sends device network access prompt information to the user.

The gateway device may send the device network access prompt information to the user in the following manner: The gateway device prompts the user in a voice manner that the first device requests to join a first network. For example, the device type, a name, and the like of the current first device may be played in a voice manner. Optionally, the gateway device may further query, in a voice manner, the user whether the first device is allowed to join the first network. If the user allows the first device to join the first network, the user may send a second indication to the gateway device in a voice manner. In some embodiments, the gateway device may send the device network access prompt information to the user in the following manner: The gateway device sends the network access prompt information to a second device. For example, the gateway device sends, to a specified application, information indicating that the first device requests to join the first network. The user enters the second indication by using the specified application. Optionally, when the device type information further includes the prompt information that near-end confirmation is required for the device to access the network, the gateway device may prompt the user to enter an identification code of the first device.

307. The user provides a first identification code to the gateway device. In some embodiments, when the user allows the first device to join the first network, the user provides the first identification code of the first device for the gateway device.

In some embodiments, the gateway device obtains the first identification code based on input of the user. Optionally, the gateway device may obtain a voice signal, and identify the first identification code from the voice signal. Optionally, the user may enter the first identification code on an input device such as a display of the gateway device. Optionally, the gateway device may communicate with a second device (for example, a mobile phone) held by the user, and obtain the first identification code from the second device. Optionally, the first identification code may be a personal identification number (PIN) of the first device.

Optionally, the first identification code may be another identification code associated with the first device. For example, the first identification code is obtained by converting the device identifier. Optionally, the gateway device may obtain a first key factor. The gateway device generates the first identification code based on the first key factor. Certainly, the first identification code may alternatively have other forms. This is not enumerated herein.

308. The gateway device sends a key exchange request to the first device.

309. The first device sends a first key value to the gateway device based on the key exchange request. The first key value may be used by the first authentication server to authenticate the first device.

310. The gateway device sends the first key value to the first authentication server.

311. The first authentication server generates first authentication information based on the first key value.

In this embodiment of this application, the first authentication server generating the first authentication information based on the first key value may be that the first authentication server performs encryption, conversion, or the like on the first key value to generate the first authentication information. For example, the first key value is transformed at least once to generate the first authentication information. For example, the first key information is encrypted by using a key factor, or pre-set data is encrypted by using a first key, to generate the first authentication information.

312. The first authentication server sends the first authentication information to the gateway device.

In some embodiments, in addition to sending the first authentication information to the gateway device, the first authentication server further sends additional information to the gateway device. The additional information is used to verify the first authentication information. In some embodiments, the additional information and the first authentication information may be sent in a same message to the gateway device. Optionally, the first authentication server may separately send the additional information and the first authentication information to the gateway device. Optionally, the first authentication server may send the additional information to the gateway device according to a request of the gateway device. In some embodiments, the additional information includes a first random value.

313. The gateway device sends the first authentication information to the first device.

314. The first device verifies the first authentication information based on the first key value, to obtain a first verification result.

Optionally, the first device may pre-store the first key value. The first device verifies the first authentication information based on the pre-stored first key value. Optionally, the first device may generate the first key value. The first device may verify the first authentication information based on the generated first key value. Optionally, the first device may pre-store a key associated with the first key value, and the first device verifies the first authentication information by using the key associated with the first key value. For example, the first key value is a public key of the first device. The first device verifies the first authentication information by using a private key of the first device. Optionally, the first device may generate first verification information based on the first key value. A manner of generating the first verification information is the same as the manner of generating the first authentication information, and reference may be made to step 311. If the first verification information is consistent with the first authentication information through comparison, the first authentication information is successfully verified by the first device, that is, the first verification result indicates that the verification succeeds; otherwise, the first verification result indicates that the verification fails.

315. The first device sends the first verification result to the gateway device.

316. The gateway device generates second authentication information based on the first identification code.

In some embodiments, the gateway device may perform encryption, conversion, or the like on the first identification code to generate the second authentication information. For example, the first identification code is transformed at least once to generate the second authentication information. For example, the first identification code is encrypted by using a pre-set key factor, or pre-set data is encrypted by using the first identification code, to generate the second authentication information.

317. The gateway device sends the second authentication information to the first device.

318. The first device verifies the second authentication information based on the first identification code, to obtain a second verification result.

Optionally, the first device pre-stores the first identification code. The first device generates second verification information based on the first identification code, and the first device compares the second verification information with the second authentication information, and obtains the second verification result based on a comparison result. A manner of generating the second verification information based on the first identification code is consistent with the manner of generating the second authentication information, and reference may be made to step 316. Therefore, if the second verification information is consistent with the second authentication information through comparison, the second authentication information is successfully verified, that is, the second verification result indicates that the verification succeeds; otherwise, the second verification result indicates that the verification fails.

In this embodiment of this application, if both of the first verification result and the second verification result indicate that the verification succeeds, the first device verifies that the gateway device and the first authentication server are valid.

319. The first device generates third authentication information based on the first identification code, and the first device generates fourth authentication information based on the first key value. For a manner of generating the third authentication information, reference may be made to the manner of generating the second authentication information in step 316. For a manner of generating the fourth authentication information, reference may be made to the manner of generating the first authentication information in step 311. Details are not described herein again. Optionally, the third authentication information is different from the second authentication information, and the fourth authentication information is different from the first authentication information.

320. The first device sends the third authentication information, the fourth authentication information, and the first verification result to the gateway device.

321. The gateway device verifies the third authentication information based on the first identification code, to obtain a third verification result. Optionally, the gateway device may generate third verification information based on the first identification code. The gateway device compares the third verification information with the third authentication information, and obtains the third verification result based on a comparison result. A manner of generating the third verification information based on the first identification code is the same as the manner of generating the third authentication information. Therefore, if the third verification information is consistent with the third authentication information through comparison, the third authentication information is successfully verified, that is, the third verification result indicates that the verification succeeds; otherwise, the third verification result indicates that the verification fails.

322. The gateway device sends the fourth authentication information to the first authentication server.

323. The first authentication server verifies the fourth authentication information based on the first key value, to obtain a fourth verification result. Optionally, the first authentication server may generate fourth verification information based on the first key value. The first authentication server compares the fourth verification information with the fourth authentication information, and obtains the fourth verification result based on a comparison result. A manner of generating the fourth verification information based on the first key value is the same as the manner of generating the fourth authentication information. Therefore, if the fourth verification information is consistent with the fourth authentication information through comparison, the fourth authentication information is successfully verified, that is, the fourth verification result indicates that the verification succeeds; otherwise, the fourth verification result indicates that the verification fails.

324. The first authentication server sends the fourth verification result to the gateway device.

325. The gateway device determines that all of the first verification result, the second verification result, the third verification result, and the fourth verification result indicate that the verification succeeds.

326. The gateway device sends network access configuration data to the first device, to enable the first device to join the network.

In this embodiment of this application, verification is performed between the first device and the gateway device based on the verification information generated based on the first identification code, to implement near-end confirmation between the gateway device and the first device. Verification is performed between the first device and the first authentication server by using the verification information generated based on the first key value, to implement remote confirmation between the first authentication server and the first device. Therefore, according to the method in this embodiment of this application, when a to-be-authenticated device requests to join a network, near-end confirmation of the device can be implemented on the basis of remote authentication, thereby avoiding incorrect networking between the gateway device and the first device, ensuring that the to-be-accessed device is not incorrectly or maliciously bound, and improving device networking security.

The foregoing step 301 to step 305 are a device discovery process. In some embodiments, the device discovery process may alternatively be as follows: The gateway device may be set to periodically and automatically scan for a new device, and the activation step of step 301 is not required. When the first device sends a broadcast signal, the gateway device may automatically discover the first device. In some embodiments, the gateway device may actively send a network access invitation broadcast signal. After detecting the network access invitation broadcast signal through scanning, the first device sends a feedback signal to the configuration device. The feedback signal may include information such as the identifier of the first device.

In some embodiments, the broadcast signal or the feedback signal sent by the first device to the gateway device may include the type information of the device. In this case, the gateway device may directly provide the user with the device network access prompt information, and does not need to query the type information of the first device from the first authentication server.

In some embodiments, the first key value provided by the first device may be the public key of the first device. The first authentication server generating the first authentication information based on the public key of the first device may be encrypting data by using the public key of the first device. Correspondingly, the first device verifying the first authentication information based on the first key value includes performing the verification by using a private key value of the first device.

In this embodiment of this application, an execution sequence of step 311 to step 324 may be adjusted based on an actual requirement, and some steps may be combined into one step, or one step may be split into a plurality of steps.

In some embodiments, after the gateway device receives the first authentication information sent by the first authentication server in step 312, step 316 is performed. After the gateway device generates the second authentication information, the gateway device sends the first authentication information and the second authentication information to the first device, that is, the first authentication information and the second authentication information are sent to the first device at one time.

In some embodiments, after receiving the first authentication information and the second authentication information, the first device may first perform step 319, that is, first generate the third authentication information and the fourth authentication information, and then perform step 318. Further, the first verification result, the second verification result, the third verification result, and the fourth verification result may alternatively be provided in an implicit manner. For example, the first device performs step 318 to obtain the second verification result. When the first device determines that the second verification result indicates that the verification fails, the first device does not perform step 319. If the gateway device does not receive the third authentication information or the fourth authentication information within a pre-set time period, the first device may be determined to fail to access the network.

The foregoing are merely some examples of performing sequence adjustment, step splitting, and step combination on step 311 to step 324, and other possible manners are not enumerated herein.

Figure 5A:
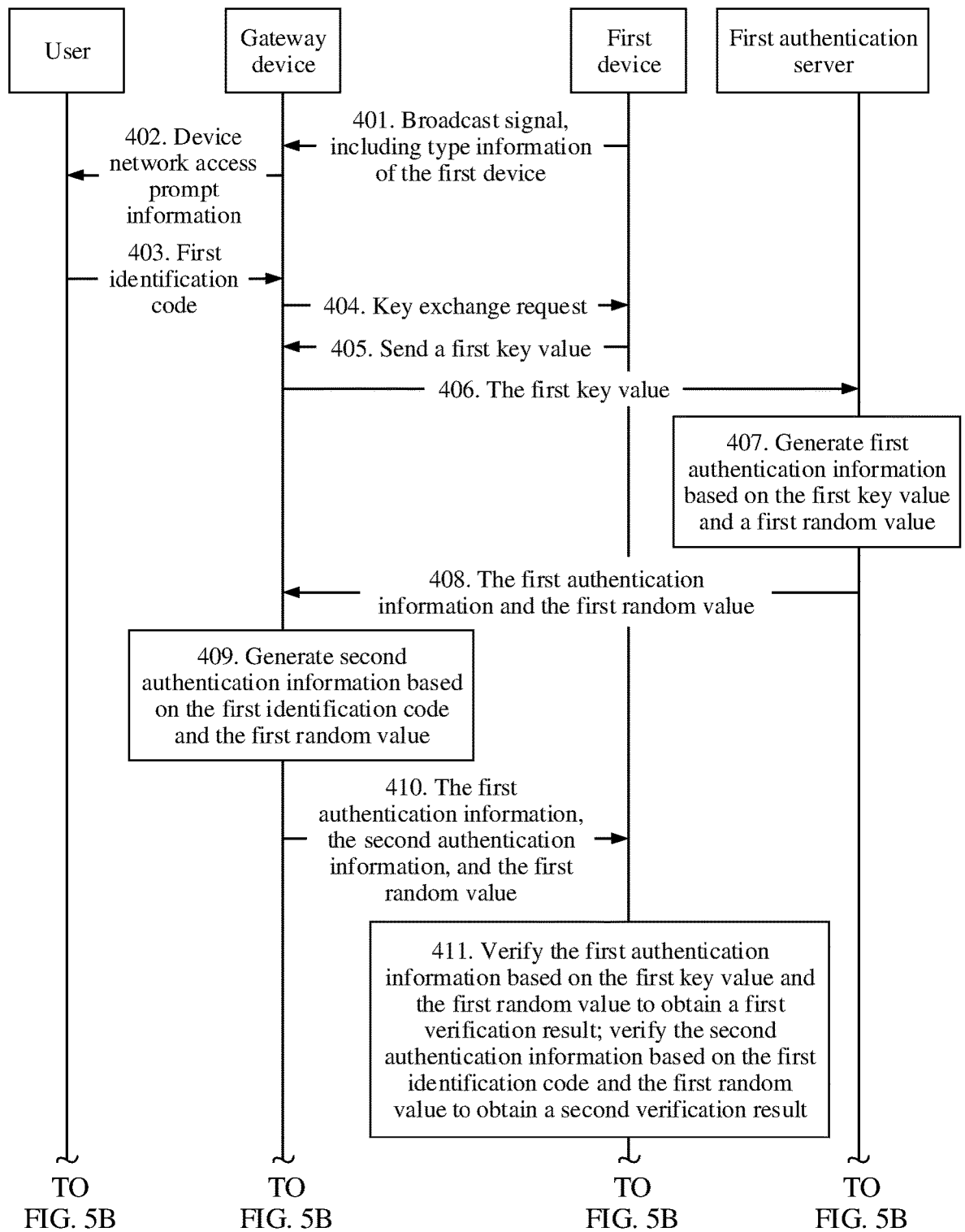
FIG. 5A and FIG. 5B are a flowchart of a Bluetooth networking method for an electronic device according to an embodiment of this application.
Figure 5B:
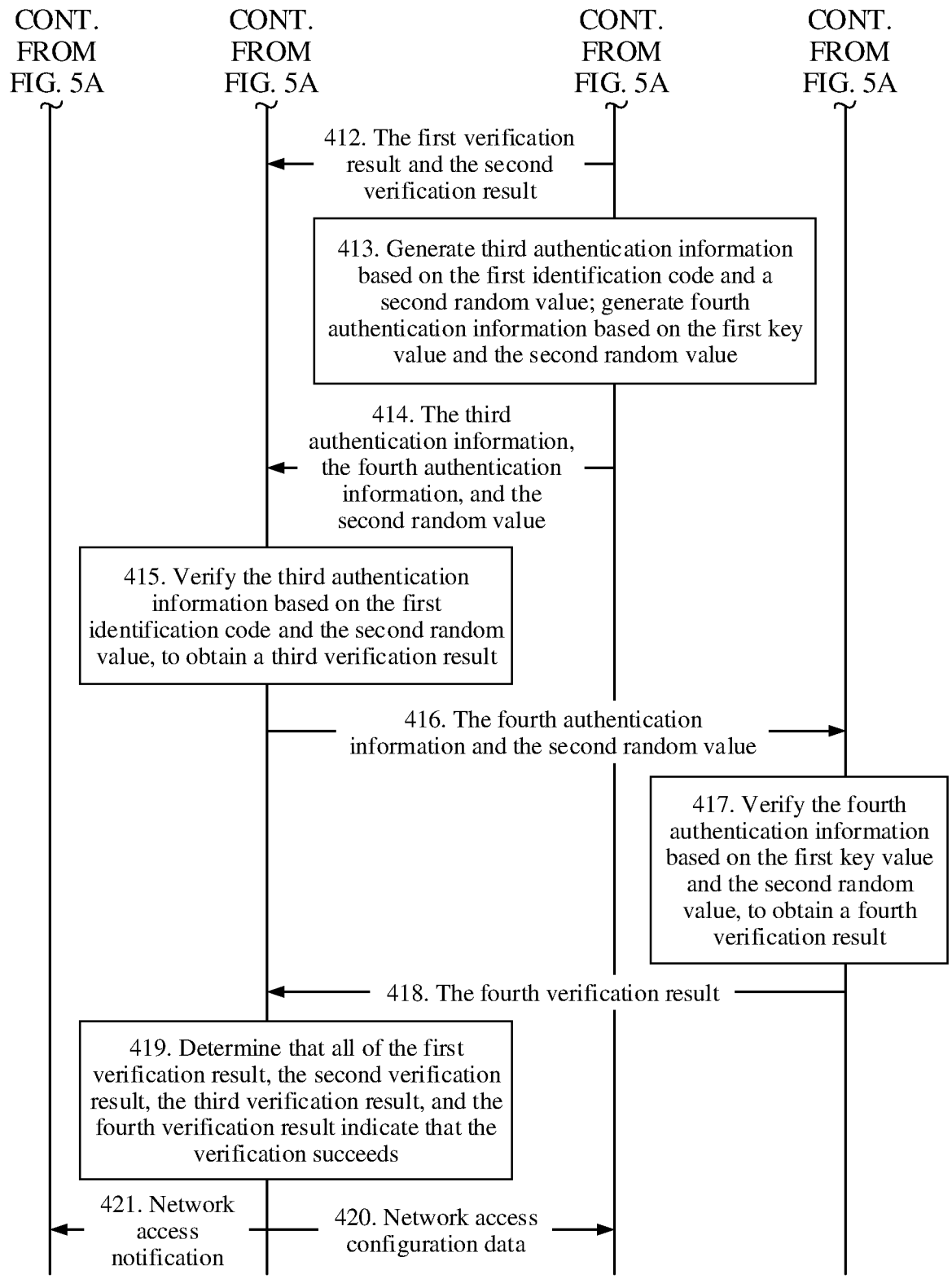

FIG. 5A and FIG. 5B are a flowchart of a Bluetooth networking method for an electronic device according to an embodiment of this application. As shown in FIG. 5A and FIG. 5B, the method includes the following processing steps.

401. A first device sends a broadcast signal. Optionally, the broadcast signal is a Bluetooth broadcast signal. In some embodiments, the broadcast signal carries type information of the first device. In some embodiments, the first device may actively initiate the broadcast signal. A gateway device discovers the first device by scanning for a signal, and obtains the device type information in the broadcast signal sent by the first device. In some embodiments, the gateway device may actively initiate a network access invitation broadcast. After detecting the network access invitation broadcast through scanning, the first device sends a broadcast signal to the gateway device.

402. A gateway device provides a user with device network access prompt information. In this embodiment of this application, the gateway device provides the network access prompt information to the user based on the device type information in the broadcast signal sent by the first device. Optionally, the gateway device may play the type information of the device in a voice manner. For example, the gateway device plays a type and a name of the device. The gateway device may prompt, by using the network access prompt information, the user that a device currently requests to join a first network. Optionally, the gateway device may prompt, by using the network access prompt information, the name, the type, and the like of the device that requests to join the first network.

In some embodiments, the gateway device may prompt the user that authentication of an identification code is required for the first device to join the first network, and prompt the user to enter the identification code.

403. The user provides the first identification code to the gateway device.

Optionally, the gateway device may receive a voice signal of the user. The gateway device obtains the first identification code from the voice signal. Optionally, the gateway device may display an interface for entering the first identification code. The user enters the first identification code on the interface. Optionally, the user may enter the first identification code by using a key in the gateway device. Optionally, the user may enter the first identification code in a user-side application. The user sends the first identification code to the gateway device by using the application.

In some embodiments, before obtaining the first identification code, the gateway device further receives a connection indication sent by the user. The connection indication is used to confirm that the first device is allowed to access the first network.

404. The gateway device sends a key exchange request to the first device.

405. The gateway device receives a first key value sent by the first device. After the gateway device obtains the first identification code, processes of invitation and key exchange between the gateway device and the first device are started. Optionally, the gateway device obtains the first key value from the first device.

406. The gateway device sends the first key value to a first authentication server.

407. The first authentication server generates first authentication information based on the first key value and a first random value. In some embodiments, the first authentication server may generate the first authentication information based on the first key value and the first random value. The first random value may be a random sequence generated by the first authentication server. In an example, the first authentication server may encrypt the first random value at least once by using the first key value, to generate the authentication information. For another example, the first authentication server may combine the first key value and the first random value into one piece of data, and encrypt the combined data by using another key factor, to generate the first authentication information. A manner of generating the first authentication information based on the first key value and the first random value herein is merely an example, and other possible manners are not enumerated herein.

408. The first authentication server sends the first authentication information and the first random value to the gateway device.

409. The gateway device generates second authentication information based on the first identification code and the first random value. In some embodiments, the gateway device may encrypt the first random value at least once by using the first identification code, to generate the authentication information. For another example, the gateway device may combine the first identification code and the first random value into one piece of data, and encrypt the combined data by using another key factor, to generate the second authentication information. A manner of generating the second authentication information based on the first identification code and the first random value herein is merely an example, and other possible manners are not enumerated herein.

410. The gateway device sends the first authentication information, the second authentication information, and the first random value to the first device.

411. The first device verifies the first authentication information based on the first key value and the first random value, to obtain a first verification result. The first device verifies the second authentication information based on the first identification code and the first random value to obtain a second verification result. Optionally, the first device may pre-store the first key value. The first device may generate first verification information based on a first verification value and the first random value. A manner of generating the first verification information is the same as the manner of generating the first authentication information, and reference may be made to step 407. If the first verification information is consistent with the first authentication information through comparison, the first authentication information is successfully verified by the first device, that is, the first verification result indicates that the verification succeeds; otherwise, the first verification result indicates that the verification fails.

Optionally, the first device pre-stores the first identification code. The first device generates second verification information based on the first identification code and the first random value. The first device compares the second verification information with the second authentication information, and obtains a second verification result based on a comparison result. A manner of generating the second verification information based on the first identification code and the first random value is consistent with the manner of generating the second authentication information, and reference may be made to step 409. Therefore, if the second verification information is consistent with the second authentication information through comparison, the second authentication information is successfully verified, that is, the second verification result indicates that the verification succeeds; otherwise, the second verification result indicates that the verification fails.

412. The first device sends the first verification result and the second verification result to the gateway device.

413. The first device generates third authentication information based on the first identification code and a second random value, and the first device generates fourth authentication information based on the first key value and the second random value. The second random value is a random sequence generated by the first device.

For a manner of generating the third authentication information based on the first identification code and the second random value, reference may be made to the manner of generating the second authentication information based on the first identification code and the first random value in step 409. For a manner of generating the fourth authentication information based on the first key value and the second random value, reference may be made to the manner of generating the first authentication information based on the first key value and the first random value in step 407. Details are not described herein again.

414. The first device sends the third authentication information, the fourth authentication information, and the second random value to the gateway device.

415. The gateway device verifies the third authentication information based on the first identification code and the second random value, to obtain a third verification result. For a manner of verifying the third authentication information by the gateway device, reference may be made to step 321. Details are not described herein again.

416. The gateway device sends the fourth authentication information and the second random value to the first authentication server.

417. The first authentication server verifies the fourth authentication information based on the first key value and the second random value, to obtain a fourth verification result. For a manner of verifying the fourth authentication information by the first authentication server, reference may be made to step 323. Details are not described herein again.

418. The first authentication server sends the fourth verification result to the gateway device.

419. The gateway device determines that all of the first verification result, the second verification result, the third verification result, and the fourth verification result indicate that the verification succeeds.

420. The gateway device sends network access configuration data to the first device.

421. The gateway device sends a network access notification to the first device.

In this embodiment of this application, the second device of the user may be used to control the first device to access the first network. In a process in which the first device accesses the first network, two-way authentication between the first device and the first authentication server and two-way authentication between the gateway device and the first device can be implemented, and near-end confirmation between the gateway device and the first device can be implemented on the basis of remote authentication.

Step 401 is a device discovery process. In some embodiments, for a device discovery process, reference may be made to step 301 to step 305 in FIG. 4A. Details are not described herein again.

In this embodiment of this application, an execution sequence of step 407 to step 418 may be adjusted based on an actual requirement, and some steps may be combined into one step, or one step may be split into a plurality of steps.

In some embodiments, the first authentication information and the first random value may be separately sent. For example, after receiving the first authentication information and the first random value based on step 408, the gateway device first sends the first authentication information to the first device. After receiving the third authentication information and the fourth authentication information that are sent by the first device, the gateway device sends the first random value to the first device.

In some embodiments, the third authentication information/the fourth authentication information and the second random value may also be separately sent. For example, after verifying the first authentication information and the second authentication information to obtain the first verification result and the second verification result, the first device sends the second random value to the gateway device. Alternatively, the first device may send the second random value to the gateway device when determining that the first verification result and the second verification result indicate that the verification succeeds.

In some embodiments, steps of verifying the first authentication information and the second authentication information may be adjusted. For example, after receiving the first authentication information and the second authentication information, the first device first performs step 413 to generate the third authentication information and the fourth authentication information, and then performs step 411. Certainly, the first verification result, the second verification result, the third verification result, and the fourth verification result may alternatively be provided in an implicit manner.

The foregoing are merely some examples of performing sequence adjustment, step splitting, and step combination on step 407 to step 418, and other possible manners are not enumerated herein.

Figure 6A:
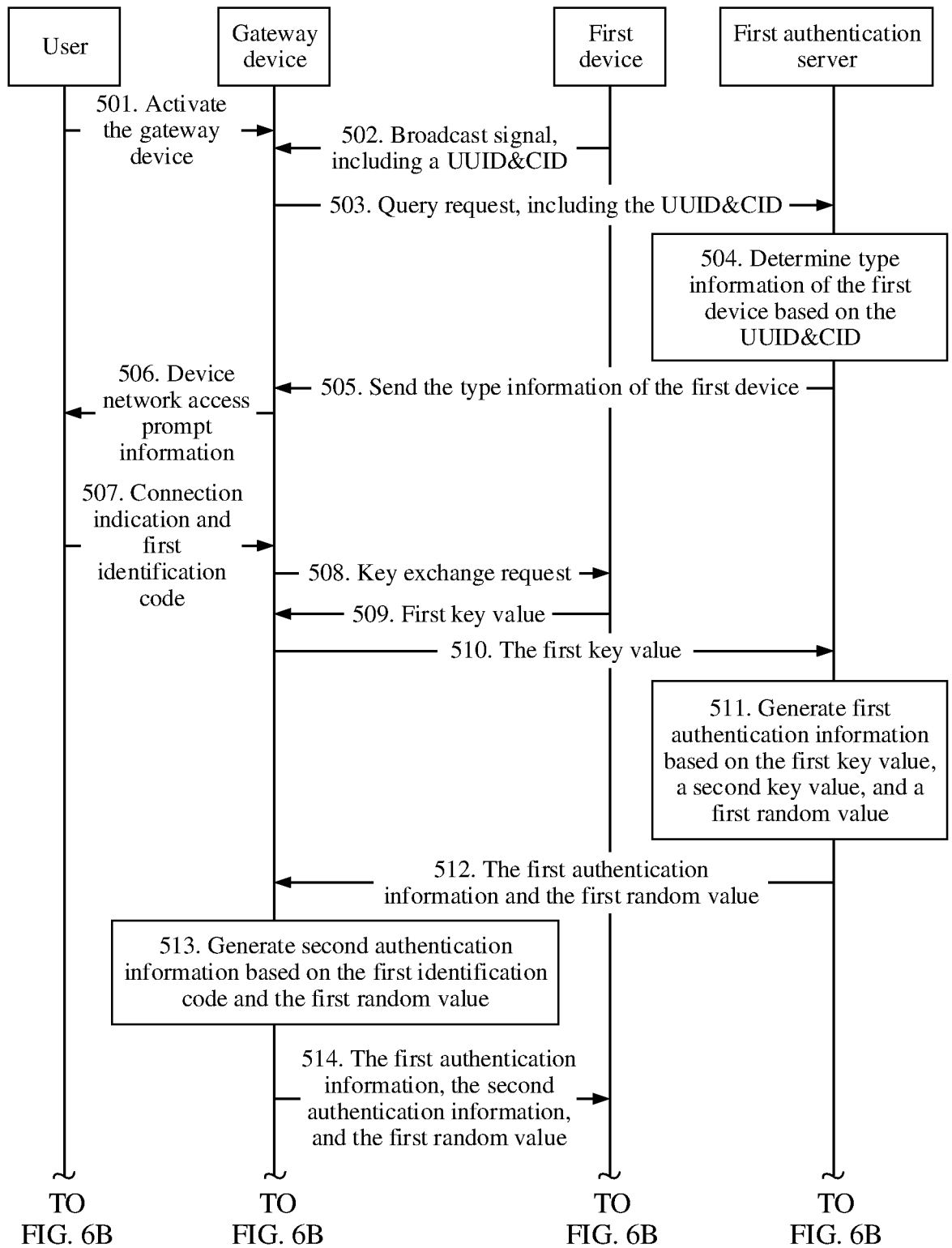
FIG. 6A to FIG. 6C are a flowchart of a Bluetooth networking method for an electronic device according to an embodiment of this application.
Figure 6B:
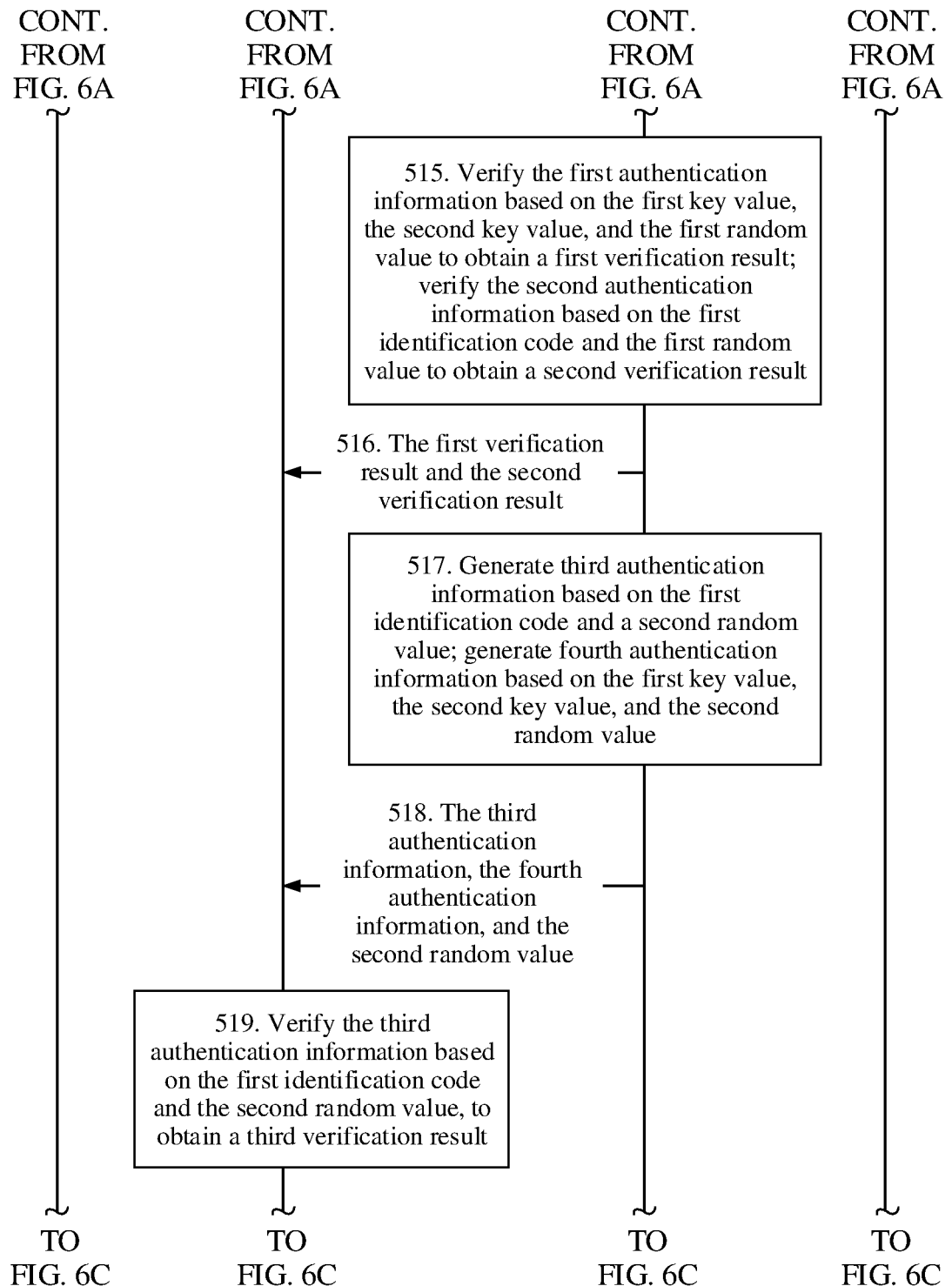
Figure 6C:
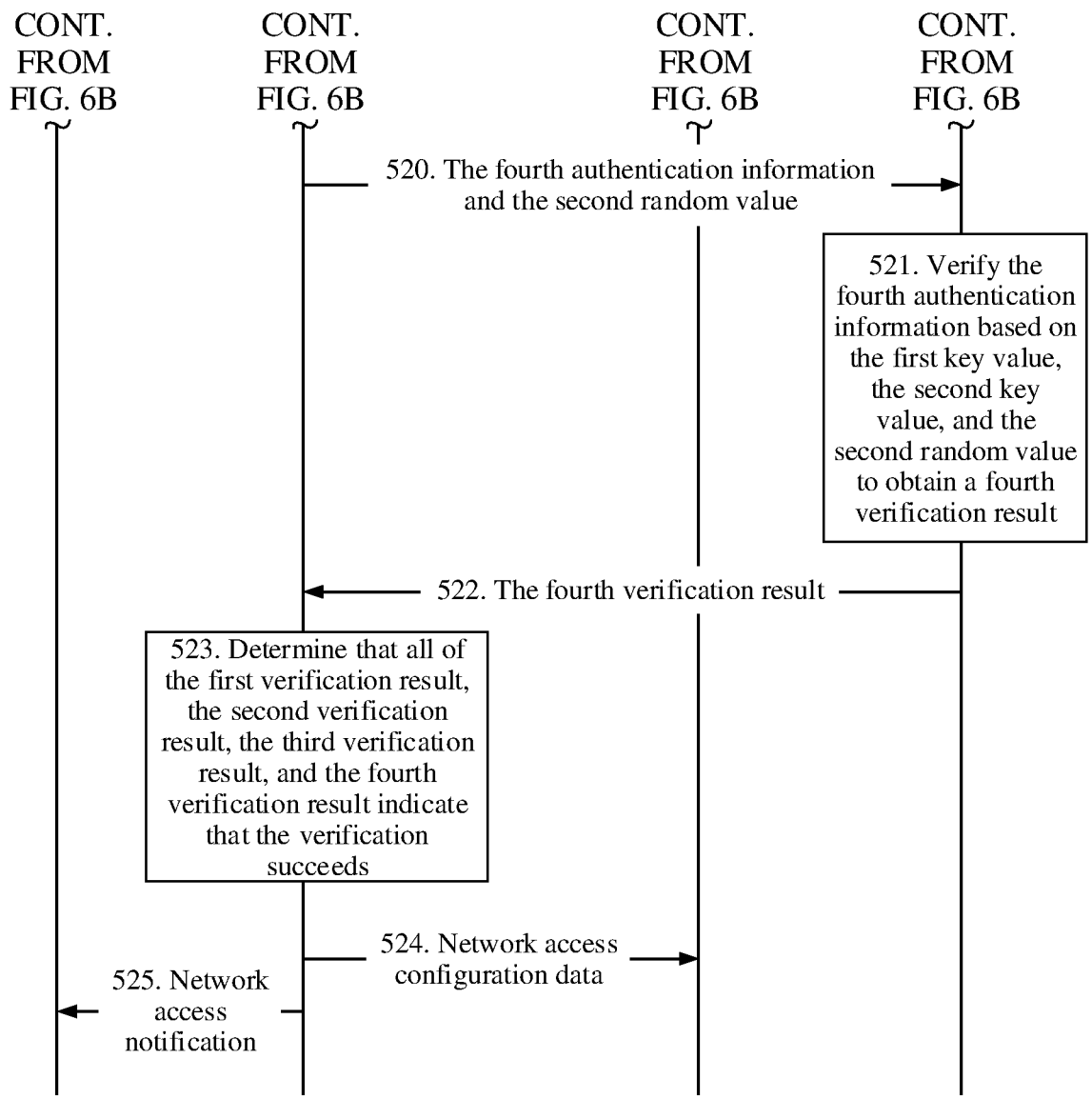

FIG. 6A to FIG. 6C are a flowchart of a Bluetooth networking method for an electronic device according to an embodiment of this application. As shown in FIG. 6A to FIG. 6C, the method includes the following processing steps.

501. A user activates a gateway device. For specific steps, reference may be made to the description of step 201 in FIG. 3A. Details are not described herein again.

502. The gateway device receives a broadcast signal sent by a first device. Optionally, the broadcast signal is a Bluetooth broadcast signal. In some embodiments, the broadcast signal carries a device identifier and first prompt information. The device identifier may include a UUID. Optionally, in addition to the UUID, the device identifier may further include a CID. In the example shown in FIG. 6A to FIG. 6C, the device identifier carried in the broadcast signal includes the UUID and the CID. The first prompt information is used to prompt that an identification code is required for access authentication of the first device.

503. The gateway device sends a query request to a first authentication server, where the query request includes the UUID and the CID.

504. The first authentication server determines type information of the first device based on the query request. Optionally, the first authentication server determines the type information of the first device based on the UUID and the CID.

505. The first authentication server sends the type information of the first device to the gateway device.

506. The gateway device sends device network access prompt information. In some embodiments, the gateway device sends the device network access prompt information based on the obtained device type information. Optionally, the gateway device may play the type information of the device in a voice manner. For example, the gateway device plays a type and a name of the device. The gateway device may prompt, by using the network access prompt information, the user that a device currently requests to join a first network. Optionally, the gateway device may further prompt, by using the network access prompt information, the name, the type, and the like of the device that requests to join the first network.

In some embodiments, the gateway device may further prompt, by using the network access prompt information, the user that authentication of an identification code is required for the first device to join the first network, and prompt the user to enter the identification code.

507. The gateway device receives a connection indication and a first identification code.

In some embodiments, the gateway device receives the connection indication sent by the user. The connection indication is used to confirm that the first device is allowed to access the first network.

In some embodiments, the connection indication sent by the user includes the first identification code. In some embodiments, the first identification code is sent after the user sends the connection indication. Optionally, the user may enter the first identification code in a user-side APP, and send the first identification code to the gateway device by using the APP. Optionally, the gateway device may obtain a voice signal input by the user and identify the first identification code from the voice signal. Optionally, the gateway device may display an interface for entering the first identification code. The user enters the first identification code on the interface. Optionally, the user may enter the first identification code by using a key in the gateway device.

508. The gateway device sends a key exchange request to the first device.

509. The gateway device receives a first key value sent by the first device. After the gateway device obtains the first identification code, the gateway device and the first device start processes of invitation and key exchange. Optionally, the gateway device obtains the first key value from the first device.

510. The gateway device sends the first key value to the first authentication server.

511. The first authentication server generates first authentication information based on the first key value, a second key value, and a first random value.

In some embodiments, the first random value may be a random sequence generated by the first authentication server. The second key value may be generated by the first authentication server based on information about the first device. Optionally, the information about the first device may be the device identifier of the first device, address information of the first device, and a key factor of the first device. The device identifier of the first device may be, for example, identification information used to identify a device type. The address information of the first device is, for example, a Media Access Control (Media Access Control, MAC) address or an Internet Protocol (Internet Protocol, IP) address of the first device. The key factor of the first device may be, for example, a network access installation code of the first device. When generating the second key value, the first authentication server may generate the second key value based on one or a combination of a plurality of items in the foregoing device information. In a specific example, the first authentication server generates the second key value based on a product type number, the MAC address, and the installation code that are of the first device.

The first authentication server may generate the first authentication information based on the first key value, the second key value, and the first random value. Optionally, the first authentication server may combine the first key value and the second key value into a third key value, and encrypt the first random value by using the third key value, to obtain the first authentication information. Optionally, the first authentication server may encrypt the first random value by using the second key value, and then perform encryption by using the first key value, to obtain the first authentication information. Optionally, the first authentication server may combine the second key value and the first random value into one piece of data, and then encrypt the data by using the first key value, to obtain the first authentication information. Certainly, the first authentication information may alternatively be generated in other manners, and other possible manners are not described herein by using examples one by one.

512. The first authentication server sends the first authentication information and the first random value to the gateway device.

513. The gateway device generates second authentication information based on the first identification code and the first random value. For a manner of generating the second authentication information by the gateway device, reference may be made to step 409, and details are not described herein again.

514. The gateway device sends the first authentication information, the second authentication information, and the first random value to the first device.

515. The first device verifies the first authentication information based on the first key value, the second key value, and the first random value to obtain a first verification result, and the first device verifies the second authentication information based on the first identification code and the first random value to obtain a second verification result.

Optionally, the first device may pre-store the first key value. Optionally, the first device may generate the second key value based on the information about the first device. For a manner of generating the second key value, reference may be made to step 511. Details are not described herein again. Optionally, the first device may generate the first verification information based on the first key value, the second key value, and the first random value. A manner of generating the first verification information is the same as the manner of generating the first authentication information, and reference may be made to step 511. If the first verification information is consistent with the first authentication information through comparison, the first authentication information is successfully verified by the first device, that is, the first verification result indicates that the verification succeeds; otherwise, the first verification result indicates that the verification fails. Optionally, for a manner of verifying the second authentication information by the first device, reference may be made to step 411. Details are not described herein again.

516. The first device sends the first verification result and the second verification result to the gateway device.

517. The first device generates third authentication information based on the first identification code and a second random value, and the first device generates fourth authentication information based on the first key value, the second key value, and the second random value. Optionally, the second random value may be a random sequence generated by the first device. The second key value may be generated by the first device based on the information about the first device.

For a manner of generating the second key value, reference may be made to step 511. Details are not described herein again.

Optionally, for a manner of generating the third authentication information based on the first identification code and the second random value, reference may be made to the manner of generating the second authentication information based on the first identification code and the first random value in step 409. Details are not described herein again.

Optionally, for generating the fourth authentication information based on the first key value, the second key value, and the second random value, reference may be made to the manner of generating the first authentication information in step 511. Details are not described herein again.

518. The first device sends the third authentication information, the fourth authentication information, and the second random value to the gateway device.

519. The gateway device verifies the third authentication information based on the first identification code and the second random value to obtain a third verification result. For a manner of verifying the third authentication information by the gateway device, reference may be made to step 321. Details are not described herein again.

520. The gateway device sends the fourth authentication information and the second random value to the first authentication server.

521. The first authentication server verifies the fourth authentication information based on the first key value, the second key value, and the second random value, to obtain a fourth verification result. For a manner of verifying the fourth authentication information by the first authentication server, reference may be made to step 323. Details are not described herein again.

522. The first authentication server sends the fourth verification result to the gateway device.

523. The gateway device determines that all of the first verification result, the second verification result, the third verification result, and the fourth verification result indicate that the verification succeeds.

524. The gateway device sends network access configuration data to the first device.

525. The gateway device sends a network access notification to the user.

Figure 7A:
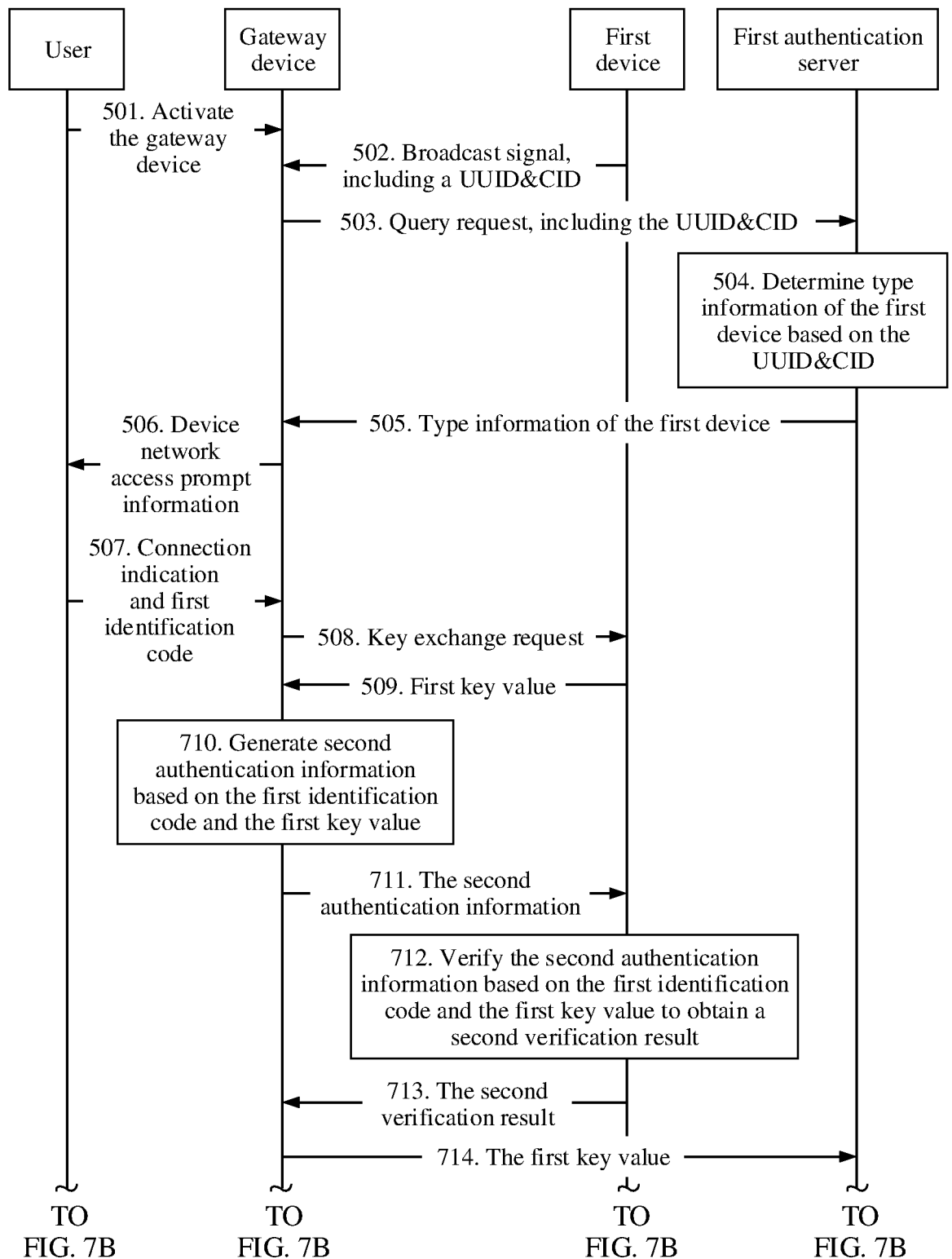
FIG. 7A to FIG. 7C are a flowchart of a Bluetooth networking method for an electronic device according to an embodiment of this application.
Figure 7B:
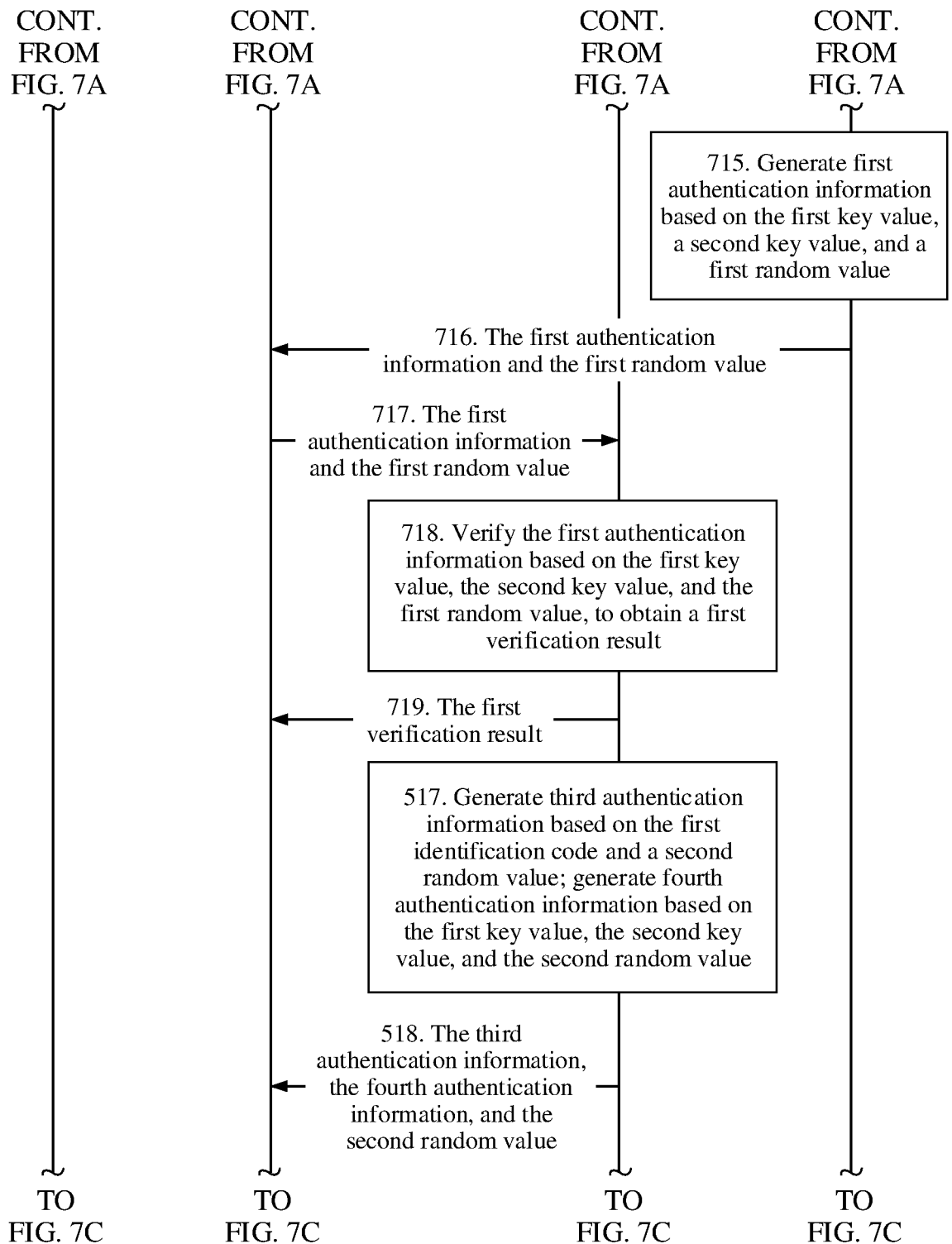
Figure 7C:
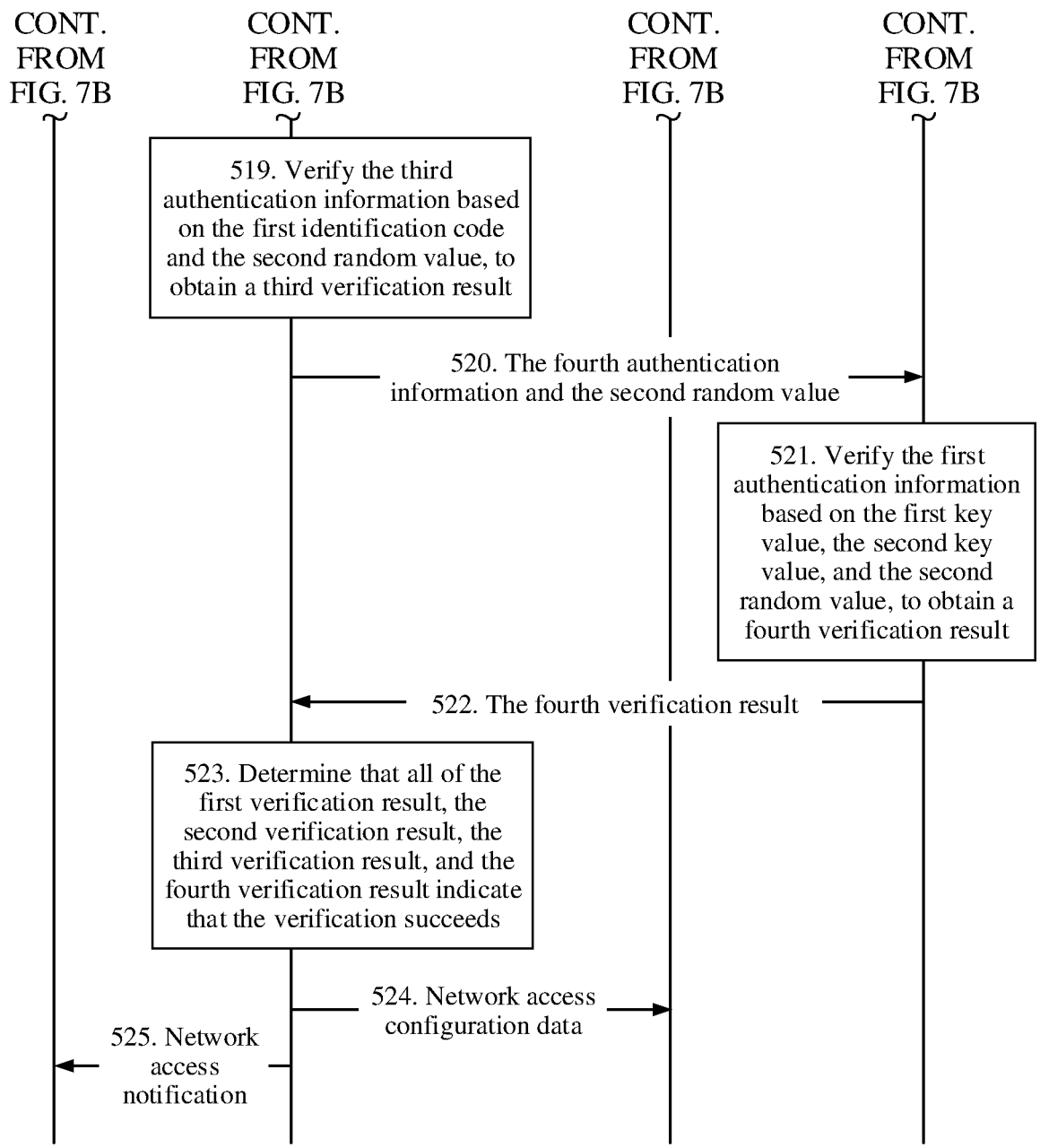
Figure 8A:
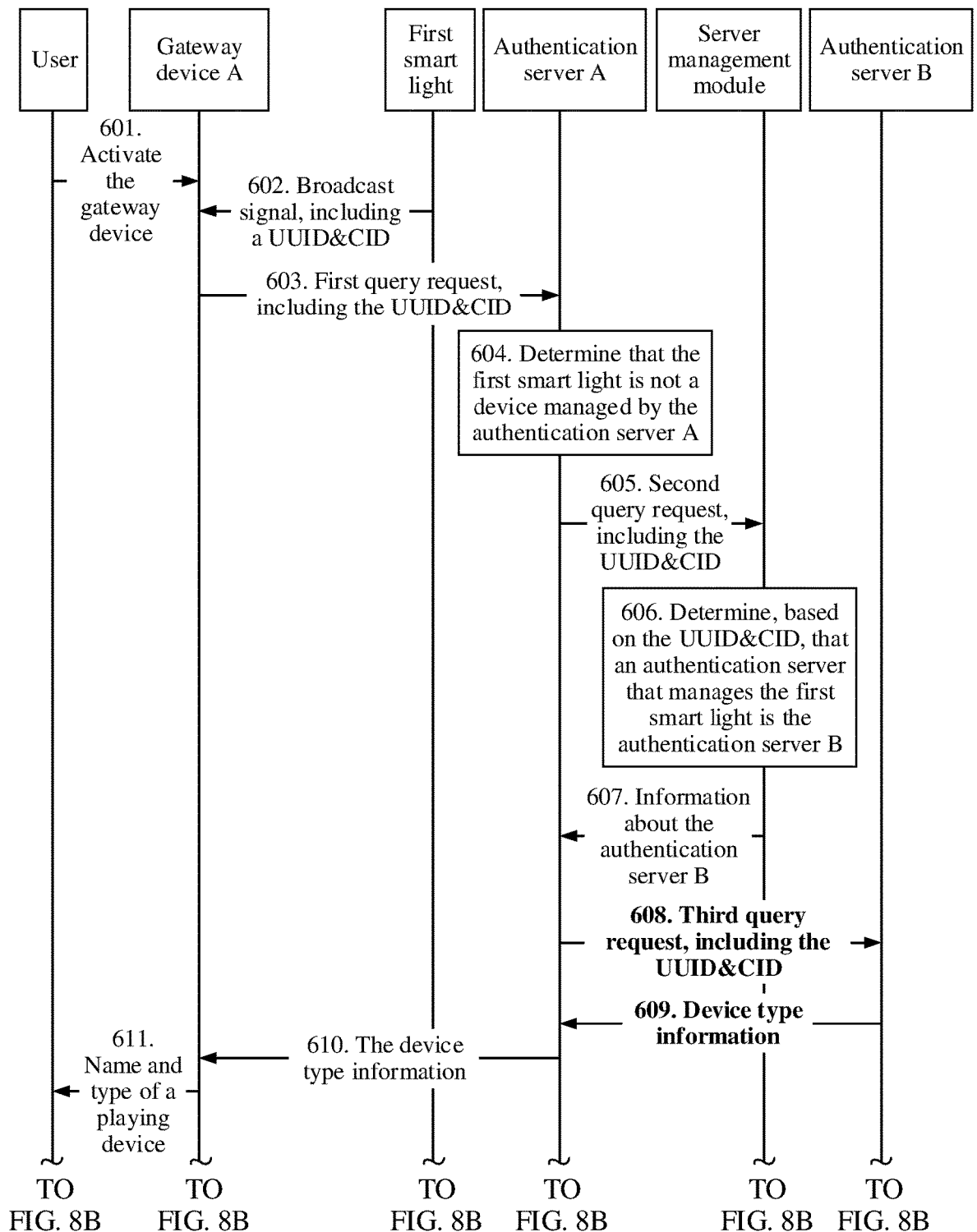
FIG. 8A to FIG. 8D are a flowchart of a Bluetooth networking method for an electronic device according to an embodiment of this application.
Figure 8B:
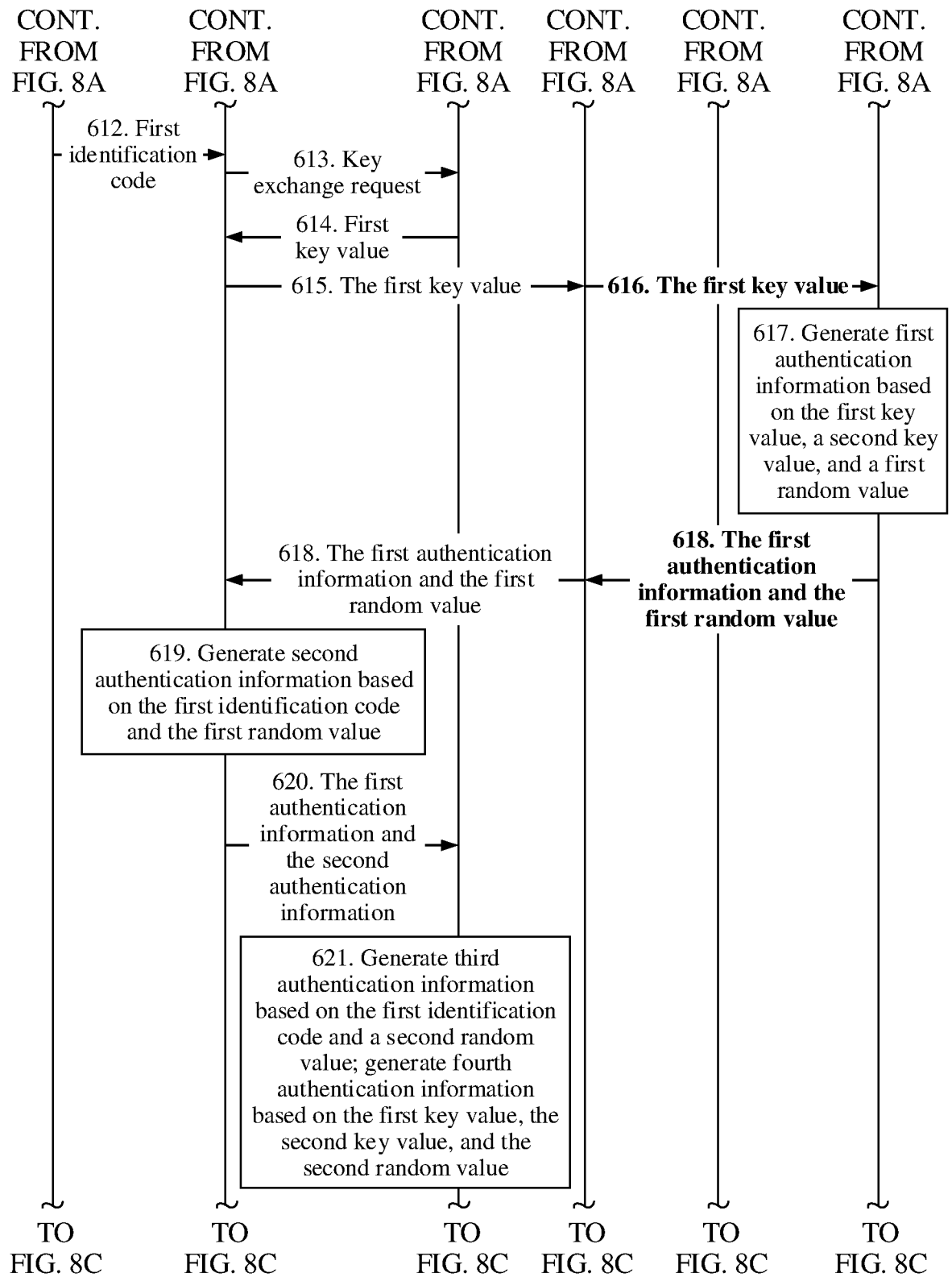
Figure 8C:
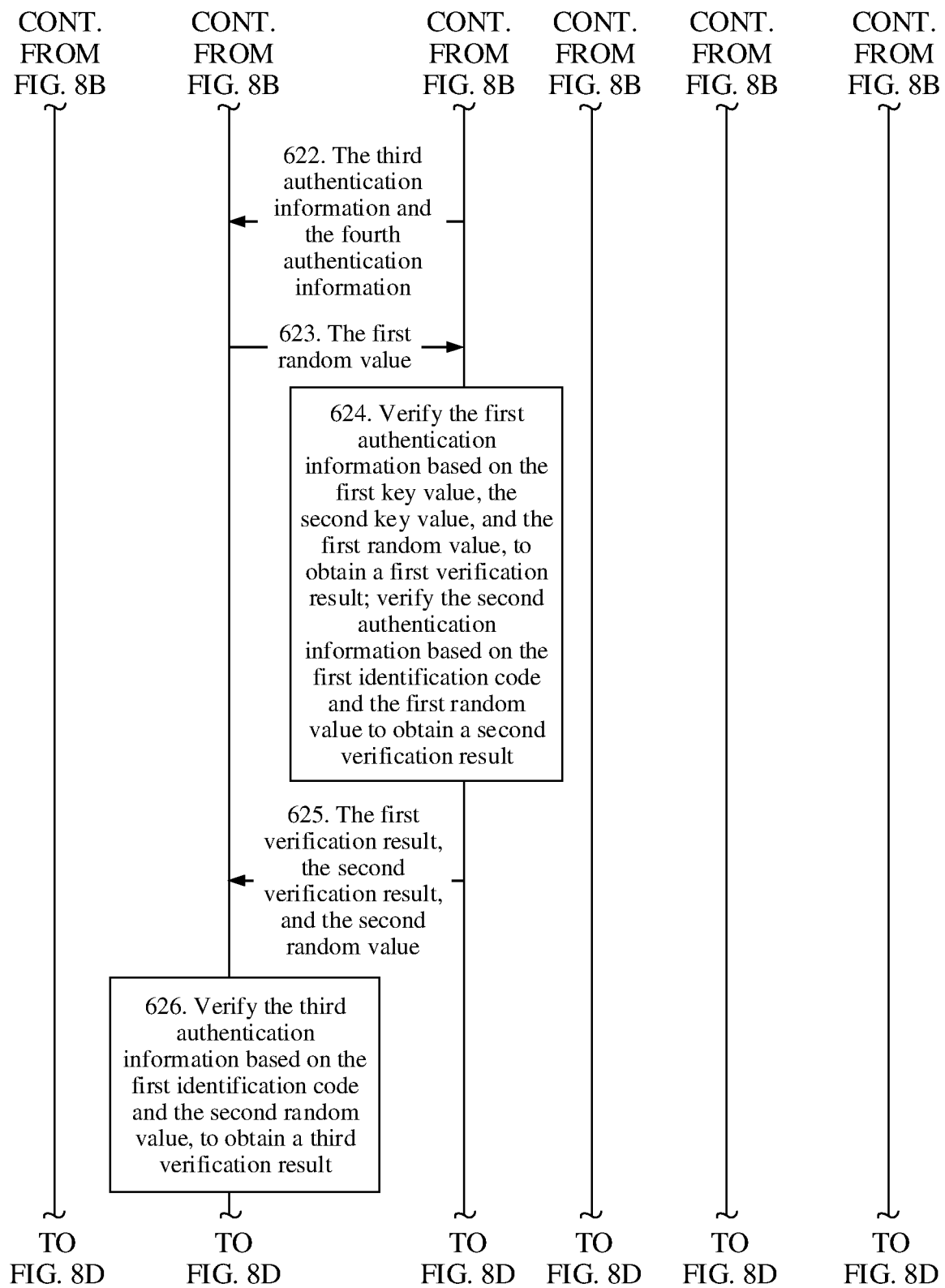
Figure 8D:
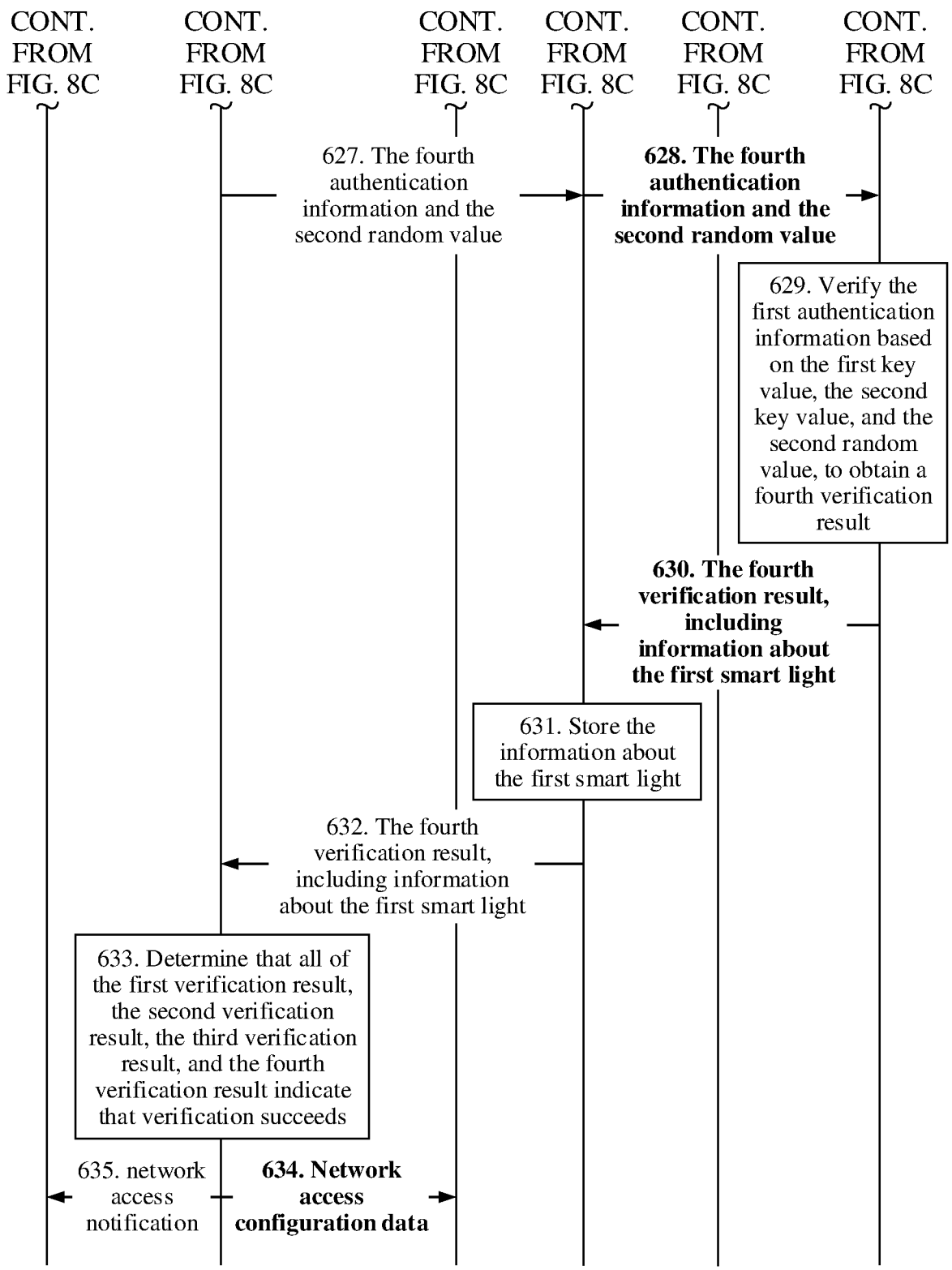

In this embodiment of this application, an execution sequence of step 510 to step 522 may be adjusted based on an actual requirement, and some steps may be combined into one step, or one step may be split into a plurality of steps. As shown in FIG. 7A to FIG. 7C, on the basis of the steps shown in FIG. 6A and FIG. 6B, step 510 to step 516 are adjusted to step 710 to step 719, and step 710 to step 719 include:

710. The gateway device generates second authentication information based on a first identification code and a first key value.

711. The gateway device sends the second authentication information to the first device.

712. The first device verifies the second authentication information based on the first identification code and the first key value to obtain a second verification result.

713. The first device sends the first verification result to the gateway device.

714. The gateway device sends the first key value to the first authentication server.

715. The first authentication server generates first authentication information based on the first key value, a second key value, and a first random value.

716. The first authentication server sends the first authentication information and the first random value to the gateway device.

717. The gateway device sends the first authentication information and the first random value to the first device.

718. The first device verifies the first authentication information based on the first key value, the second key value, and the first random value, to obtain a first verification result.

719. The first device sends the first verification result to the gateway device. Then, step 517 to step 525 are performed, and details are not described again.

FIG. 8A to FIG. 8D are a flowchart of a Bluetooth networking method for an electronic device according to an embodiment of this application. In the method shown in FIG. 8A to FIG. 8D, a first smart light is a device that is to access a first network. A gateway device in the first network is a gateway device A. The first network includes an authentication server A and an authentication server B. The authentication server A and the authentication server B store a device identifier (for example, a UUID and a CID of the device) and type information of the device. If the authentication server A stores a device identifier of the first smart light and type information of the device, the first smart light is a device managed by the authentication server A. If the authentication server B stores the device identifier of the first smart light and the type information of the device, the first smart light is a device managed by the authentication server B. As shown in FIG. 8A to FIG. 8D, the gateway device A is in communication connection with the authentication server A. When the first smart light is a device managed by the authentication server A, the first smart light may communicate with the authentication server A by using the gateway device A, to implement a network access authentication process for the first smart light. For a specific process, reference may be made to the processes shown in FIG. 1 to FIG. 7C. Optionally, when the first smart light is not a device managed by the authentication server A, a processing procedure for the first smart light to access the first network by using the gateway device A is shown in FIG. 8A to FIG. 8D, and includes the following steps.

601. A user activates a gateway device A. For specific steps, reference may be made to the description of step 201 in FIG. 3A. Details are not described herein again.

602. The gateway device A receives a broadcast signal sent by the first smart light, where the broadcast signal includes a UUID and a CID that are of the first smart light.

603. The gateway device A sends a first query request to an authentication server A, where the first query request includes the UUID and the CID that are of the first smart light.

604. The authentication server A determines that the first smart light is not a device managed by the authentication server A. The authentication server A determines whether the UUID and the CID of the first smart light are included in a stored device identifier. If the device identifier stored in the authentication server A does not include the UUID or the CID that are of the first smart light, the authentication server A determines that the first smart light is not a device managed by the authentication server A, and performs step 605.

605. The authentication server A sends a second query request to a server management module, where the second query request includes the UUID and the CID that are of the first smart light.

606. The server management module determines, based on the UUID and the CID, that an authentication server managing the first smart light is an authentication server B. The server management module stores an association relationship between an authentication server and a device managed by the authentication server. For example, the server management module stores an association relationship between the authentication server A and a device identifier managed by the authentication server A. Optionally, the server management module further stores an association relationship between the authentication server B and a device identifier managed by the authentication server B. Certainly, the server management module may also store an association relationship between another authentication server and a device identifier managed by the authentication server. When receiving the UUID and the CID that are sent by the A authentication server, the server management module may determine, based on stored information, an authentication server associated with the UUID and the CID. In this embodiment, the UUID and the CID that are of the first smart light are associated with the authentication server B, that is, the authentication server that manages the first smart light is the authentication server B.

607. The server management module sends information about the authentication server B to the authentication server A.

608. The authentication server A sends a third query request to the authentication server B, where the third query request includes the UUID and the CID that are of the first smart light. The authentication server B determines a device type of the first smart light based on the UUID and the CID.

609. The authentication server B sends device type information to the authentication server A.

In some embodiments, after the server management module determines that the authentication server managing the first smart light is the authentication server B, the server management module may directly send the third query request to the authentication server B. Optionally, the authentication server B determines the device type information based on the UUID and the CID that are of the first smart light. Then, the authentication server B may send the device type information to the server management module, and the server management module sends the device type information to the authentication server A.

In some embodiments, after the server management module determines that the authentication server managing the first smart light is the authentication server B, the server management module sends the third query request and the information about the authentication server A to the authentication server B. The authentication server B determines the device type information based on the UUID and the CID that are of the first smart light, and the authentication server B sends the determined device information type information to the authentication server A.

610. The authentication server A sends the device type information to the gateway device A.

611. The gateway device A plays a name and a type of the device to the user. That is, the gateway device A plays, to the user, a voice of the first smart light requesting to join the first network.

612. The gateway device A receives a connection indication and a first identification code. Optionally, the first identification code may be a PIN.

In some embodiments, the gateway device A receives the connection indication sent by the user. The connection indication is used to confirm that the first smart light is allowed to access the first network.

In some embodiments, the connection indication sent by the user includes the first identification code. In some embodiments, the first identification code is sent after the user sends the connection indication.

613. The gateway device sends a key exchange request to the first device.

614. The gateway device A receives a first key value sent by the first smart light. After the gateway device A obtains the first identification code, processes of invitation and key exchange between the gateway device A and the first smart light are started. Optionally, the gateway device A obtains the first key value from the first smart light.

615. The gateway device A sends the first key value to the authentication server A.

616. The authentication server A sends the first key value to the authentication server B.

617. The authentication server B generates first authentication information based on the first key value, a second key value, and a first random value.

In some embodiments, the first random value may be a random sequence generated by the authentication server B. The second key value may be generated by the authentication server B based on the information about the first smart light. Optionally, the information about the first smart light may be the device identifier of the first smart light, address information of the first smart light, and a key factor of the first smart light. The device identifier of the first smart light may be, for example, identification information used to identify a device product type. The address information about the first smart light is, for example, a MAC address or an IP address of the first smart light. The key factor of the first smart light may be, for example, a network access installation code of the first smart light. When generating the second key value, the authentication server B may generate the second key value based on one or a combination of a plurality of items in the foregoing device information. In a specific example, the authentication server B generates the second key value based on the product type number, the MAC address, and the installation code that are of the first smart light.

618. The authentication server B sends the first authentication information and the first random value to the gateway device A. In some embodiments, the authentication server B sends the first authentication information and the first random value to the authentication server A. The authentication server A sends the first authentication information and the first random value to the gateway device A.

619. The gateway device A generates second authentication information based on the first identification code and the first random value.

620. The gateway device A sends the first authentication information and the second authentication information to the first smart light.

621. The first smart light generates third authentication information based on the first identification code and a second random value, and the first smart light generates fourth authentication information based on the first key value, the second key value, and the second random value.

622. The first smart light sends the third authentication information and the fourth authentication information to the gateway device A.

623. The gateway device A sends the first random value to the first smart light.

624. The first smart light verifies the first authentication information based on the first key value, the second key value, and the first random value to obtain a first verification result, and the first smart light verifies the second authentication information based on the first identification code and the first random value to obtain a second verification result.

625. The first smart light sends the first verification result, the second verification result, and the second random value to the gateway device A.

626. The gateway device A verifies the third authentication information based on the first identification code and the second random value to obtain a third verification result.

627. The gateway device A sends the fourth authentication information and the second random value to the authentication server A.

628. The authentication server A sends the fourth authentication information and the second random value to the authentication server B.

629. The authentication server B verifies the fourth authentication information based on the first key value, the second key value, and the second random value, to obtain a fourth verification result. The authentication server B stores the information about the first smart light. The authentication server B may generate the second key value based on the information about the first smart light. For a process in which the authentication server B generates the second key value, reference may be made to the description of step 311. Details are not described herein again.

630. The authentication server B sends the fourth verification result to the authentication server A. Optionally, the fourth verification result includes the information about the first smart light, for example, includes information such as the type and/or the identifier of the first smart light. Optionally, when the fourth verification result indicates that the verification succeeds, the fourth verification result includes the information about the first smart light.

631. The authentication server A stores the information about the first smart light. In some embodiments, when the authentication server A determines, based on the fourth verification result, that the first smart light is successfully verified by the authentication server B, the authentication server A stores the information about the first smart light.

632. The authentication server A sends the fourth verification result to the gateway device A.

633. The gateway device determines that all of the first verification result, the second verification result, the third verification result, and the fourth verification result indicate that the verification succeeds.

634. The gateway device sends network access configuration data to the first device.

635. The gateway device sends a network access notification to the user.

It should be noted that, if the fourth verification result indicates that the verification succeeds, it indicates that both two-way authentication between the first smart light and the authentication server B and two-way authentication between the gateway device A and the first smart light succeed. In this case, the gateway device A determines that the first smart light is connected to the first network.

In this embodiment of this application, when the first device accessing the first network is not a device managed by the authentication server A, the authentication server A may authenticate the first device by using the authentication server B.

In this embodiment of this application, an authentication server cluster may be set. The authentication server cluster may include different authentication servers. The different authentication servers manage different devices. When the authentication server A determines that a to-be-added device such as a first smart light is not a device managed by the authentication server A, the authentication server A may query the corresponding authentication server B by using a server management module.

In some embodiments, an authentication server manages a device based on a device type. In an example, the authentication server A manages a device of a type A, and the authentication server B manages a device of a type B. If a device accessing the authentication server A through the gateway device A is a device of the type B, the authentication server A may query the corresponding authentication server B by using the server management module.

In some embodiments, an authentication server manages a device based on a production batch of the device. For example, the authentication server A manages a device produced in a first time range, and the authentication server B manages a device produced in a second time range. If a device accessing the authentication server A through the gateway device A is not in the time range managed by the authentication server A, the authentication server A may query a corresponding authentication server B by using the server management module. Certainly, for a device management rule for an authentication server, the foregoing is merely an example, and other possible manners are not enumerated herein.

The first device in embodiments of this application may be an electronic device such as a mobile phone, a tablet, a computer, a wearable device, an in-vehicle device, a smart home device, or an augmented reality (augmented reality, AR)/a virtual reality (virtual reality, VR) device, and a specific type of the electronic device is not limited in embodiments of this application.

Figure 9:
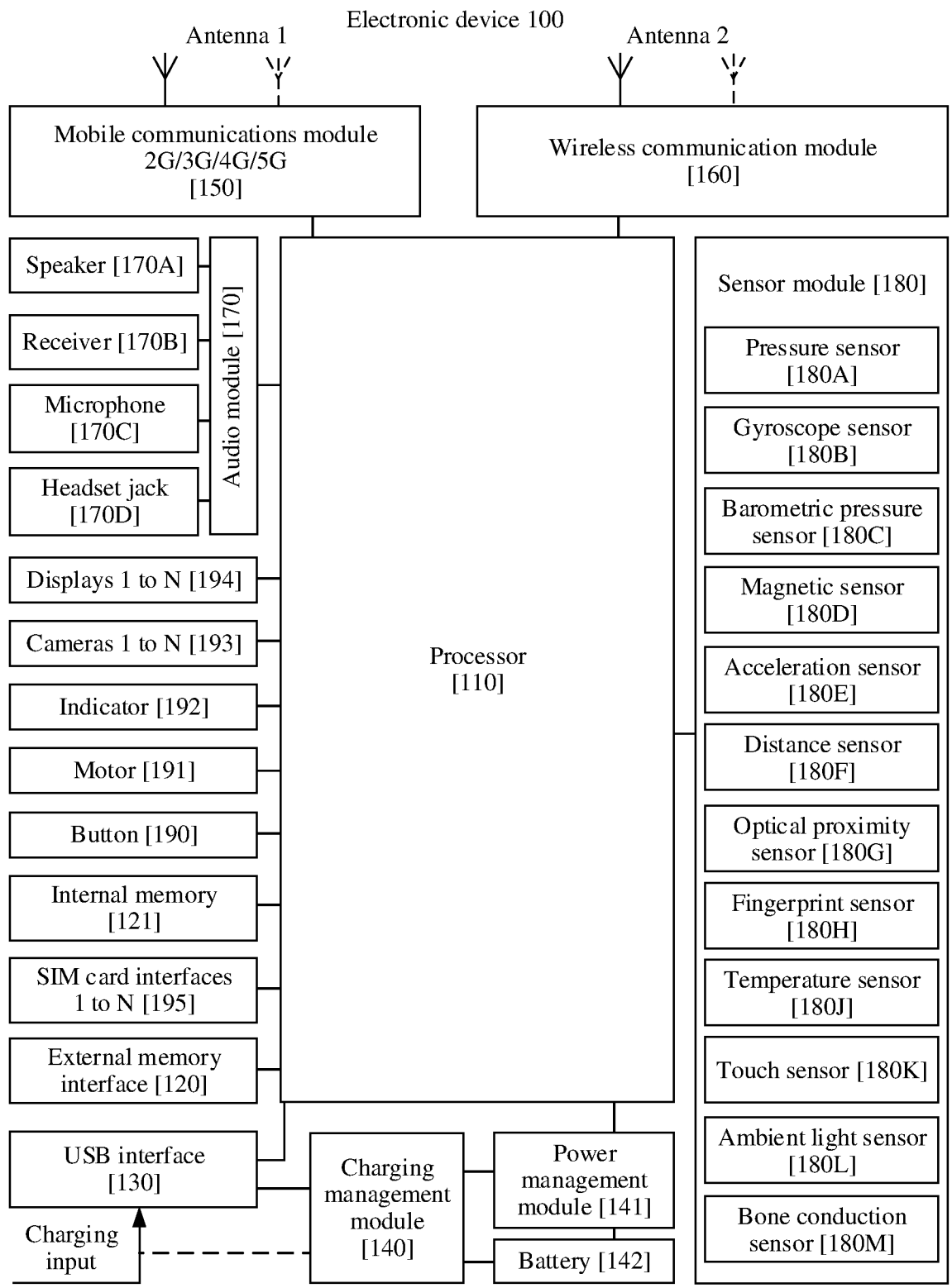
FIG. 9 is a schematic diagram of a structure of an electronic device according to an embodiment of this application.

FIG. 9 is a schematic diagram of a structure of an electronic device according to an embodiment of this application. As shown in FIG. 9, the electronic device may join a first network as a first device. As shown in FIG. 9, an electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a loudspeaker 170A, a receiver 170B, a microphone 170C, a headset jack 170D, a sensor module 180, a button 190, a motor 191, an indicator 192, a camera 193, a display 194, and a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that the interface connection relationship between the modules shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

A wireless communication function of the electronic device 100 may be implemented by using the antenna 1, the antenna 2, the mobile communications module 150, the wireless communications module 160, the modem processor, the baseband processor, and the like.

The wireless communications module 160 may provide a wireless communication solution that is applied to the electronic device 100, and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave by using the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, and the GPUs execute program instructions to generate or change display information.

The electronic device 100 may implement a photographing function by using the ISP, the camera 193, the video coder/decoder, the GPU, the display 194, the application processor, and the like.

The external memory interface 120 may be used to connect to an external storage card, for example, a micro SD card, to extend a storage capability of the electronic device 100. The external memory card communicates with the processor 110 by using the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function by using the audio module 170, the loudspeaker 170A, the receiver 170B, the microphone 170C, the headset jack 170D, the application processor, and the like. For example, music playing and recording.

In addition, function units in embodiments of this application may be integrated into one processing unit, or each of the units may exist alone physically, or two or more units are integrated into one unit. The implementations of this application may be randomly combined to achieve different technical effects.

Related parts of the method embodiments in this application may be mutually referenced. The apparatuses provided in the apparatus embodiments are configured to perform the methods provided in the corresponding method embodiments. Therefore, for the apparatus embodiments, refer to related parts in the related method embodiments for understanding.

It should be understood that sequence numbers of the foregoing processes do not mean execution sequences in various embodiments of this application. Some or all of the steps may be performed in parallel or in sequence. The execution sequences of the processes should be determined based on functions and internal logic of the processes, and should not be construed as any limitation on the implementation processes of embodiments of this application.

It should be understood that although terms "first", "second", "third", and the like may be used in embodiments of the present invention to describe various messages, requests, and terminals, the messages, the requests, and the terminals are not limited by the terms. These terms are merely used to distinguish the messages, requests, and terminals. For example, without departing from the scope of embodiments of the present invention, a first terminal may also be referred to as a second terminal, and similarly, the second terminal may also be referred to as a first terminal.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

A person of ordinary skill in the art should understand that all or some of the steps of the method specified in any foregoing embodiment may be implemented by a program instructing related hardware. The program may be stored in a readable storage medium, in a device, such as a FLASH memory, or an electrically erasable programmable read-only memory (EEPROM). When the program runs, the program executes all or part of the steps described above.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, a terminal device, or the like) to perform all or some of the steps of the methods in embodiments of this application. The foregoing storage medium includes any medium that can store program code, such as a universal serial bus (USB) flash drive, a removable hard disk, a read-only memory (ROM), a random access memory (RAM), a magnetic disk, or an optical disc. All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (Solid State Disk)), or the like. The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A Bluetooth® networking method for an electronic device, comprising:
   obtaining, by a gateway device, a first identification code of a first device;
   sending, by the gateway device, a first authentication request to the first device, wherein the first authentication request is associated with verification, by the first device, of a first authentication server;
   sending, by the gateway device, a second authentication request to the first device, wherein the second authentication request comprises second authentication information, wherein the second authentication information is generated by the gateway device based on the first identification code, and wherein the second authentication request is associated with verification, by the first device, of the gateway device based on the first identification code and the second authentication information;
   obtaining, by the gateway device, a third authentication request from the first device, wherein the third authentication request comprises third authentication information, and wherein the third authentication information is generated by the first device based on the first identification code;
   obtaining third confirmation information by verifying, by the gateway device, the first device based on the first identification code and the third authentication information;
   sending, by the gateway device, a fourth authentication request to the first authentication server, wherein the fourth authentication request is associated with verification of the first device by the first authentication server;
   obtaining, by the gateway device, first confirmation information and second confirmation information from the first device;
   obtaining fourth confirmation information from the first authentication server, wherein the first confirmation information comprises a result of an authentication performed by the first device on the first authentication server, wherein the second confirmation information comprises a result of the authentication performed by the first device on the gateway device, and wherein the fourth confirmation information comprises a result of the authentication performed by the first authentication server on the first device; and establishing a communication connection between the first device and the gateway device based on the first confirmation information, the second confirmation information, the third confirmation information, and the fourth confirmation information.

2. The method according to claim 1, wherein the obtaining the first identification code of a first device comprises:

receiving, by the gateway device, a first message; and obtaining, by the gateway device, the first identification code based on the first message, wherein the first message comprises at least one of a first voice message or a first indication message, and wherein the first indication message is sent by a second device.

3. The method according to claim 2, further comprising performing, before the obtaining the first identification code of a first device, the method further comprises:

obtaining, by the gateway device, type information of the first device; and performing at least one of:

playing, by the gateway device, a second voice message, wherein the second voice message comprises the type information of the first device;

or sending, by the gateway device, a second message to the second device, wherein the second message comprises the type information of the first device.

4. The method according to claim 3, wherein the obtaining the type information of the first device comprises:

sending, by the gateway device, a device identifier of the first device to the first authentication server, wherein the device identifier of the first device is obtained by the gateway device from the first device; and obtaining, by the gateway device, the type information of the first device from the first authentication server, wherein the type information of the first device is obtained by the first authentication server based on the device identifier of the first device.

5. The method according to claim 1, wherein the second authentication request comprises the second authentication information; and wherein the second authentication information being generated by the gateway device based on the first identification code, and wherein the second authentication request being associated with verification, by the first device, of the gateway device comprises at least one of:

the second authentication information is generated by the gateway device based on the first identification code and a first random value, the second authentication request is associated with verification, by the first device, of the gateway device based on the first identification code, the first random value, and the second authentication information, and the first random value is related to the first authentication server; or the second authentication information is generated by the gateway device based on the first identification code and a first key value, the second authentication request is associated with verification, by the first device, of the gateway device based on the first identification code, the first key value, and the second authentication information, and the first key value is related to the first device.

6. The method according to claim 5, wherein at least one of:

the first key value is a public key of the first device; or the first key value comprises one or more of a device identifier of the first device, address information of the first device, or a key factor of the first device.

7. The method according to claim 1, wherein the third authentication information is generated by the first device based on the first identification code; and wherein the obtaining the third confirmation information by verifying, by the gateway device, the first device based on the first identification code and the third authentication information, comprises:

obtaining the third confirmation information by verifying, by the gateway device, the first device based on the first identification code, a second random value, and the third authentication information, wherein the third authentication information is generated by the first device based on the first identification code and the second random value, and the second random value is related to the first device.

8. A Bluetooth® networking method for an electronic device, comprising:

receiving, by a first device, a first authentication request sent by a gateway device;

obtaining first confirmation information by verifying, by the first device, a first authentication server based on the first authentication request;

receiving, by the first device, a second authentication request sent by the gateway device, wherein the second authentication request comprises second authentication information, and wherein the second authentication information is generated by the gateway device based on a first identification code;

obtaining second confirmation information by verifying, by the first device, the gateway device based on the first identification code and the second authentication information;

sending, by the first device, a third authentication request to the gateway device, wherein the third authentication request comprises third authentication information, wherein the third authentication information is generated by the first device based on the first identification code, and wherein the third authentication request is associated with verifying, by the gateway device the first device based on the first identification code and the third authentication information;

sending, by the first device, a fourth authentication request to the gateway device, wherein the fourth authentication request is sent by the gateway device to the first authentication server, and wherein the fourth authentication request is associated with verifying, by the first authentication server, the first device; and sending, by the first device, the first confirmation information and the second confirmation information to the gateway device.

9. The method according to claim 8, further comprising performing, before the receiving the first authentication request sent by the gateway device, at least one of:

sending, by the first device, type information of the first device to the gateway device; or sending, by the first device, a device identifier of the first device to the gateway device, wherein the device identifier indicates to the gateway device to obtain type information of the first device based on the device identifier.

10. The method according to claim 8, wherein the second authentication information is generated by the gateway device based on the first identification code; and
wherein the verifying, by the first device, the gateway device based on the first identification code and the second authentication information to obtain second confirmation information comprises performing at least one of:
verifying, by the first device, the gateway device based on the first identification code, a first random value, and the second authentication information, wherein the second authentication information is generated by the gateway device based on the first identification code and the first random value, and the first random value is related to the first authentication server; or
verifying, by the first device, the gateway device based on the first identification code, a first key value, and the second authentication information, wherein the second authentication information is generated by the gateway device based on the first identification code and the first key value, and wherein the first key value is related to the first device.

11. The method according to claim 10, wherein at least one of:
the first key value is a public key of the first device; or
the first key value comprises one or more of a device identifier of the first device, address information of the first device, or a key factor of the first device.

12. The method according to claim 8, wherein the third authentication request comprises third authentication information and
wherein the third authentication information being generated by the first device based on the first identification code, and the third authentication request being associated with verifying, by the gateway device, the first device based on the first identification code and the third authentication information comprises:
the third authentication information is generated by the first device based on the first identification code and a second random value, wherein the third authentication request is associated with verifying, by the gateway device, the first device based on the first identification code, the second random value, and the third authentication information, and wherein the second random value is related to the first device.

13. A gateway device, comprising:
one or more processors; and
a memory, coupled to the one or more processors, the memory storing one or more computer programs for execution by the one or more processors, and wherein the one or more computer programs comprise instructions for:
obtaining a first identification code of a first device;
sending a first authentication request to the first device, wherein the first authentication request is associated with verification, by the first device, of a first authentication server;
sending a second authentication request to the first device, wherein the second authentication request comprises second authentication information, wherein the second authentication information is generated by the gateway device based on the first identification code, and wherein the second authentication request is associated with verification, by the first device, of the gateway device based on the first identification code and the second authentication information;
obtaining a third authentication request from the first device, wherein the third authentication request comprises third authentication information, and wherein the third authentication information is generated by the first device based on the first identification code;
obtaining third confirmation information by verifying the first device based on the first identification code and the third authentication information;
sending a fourth authentication request to the first authentication server, wherein the fourth authentication request is associated with verification of the first device by the first authentication server;
obtaining, by the gateway device, first confirmation information and second confirmation information from the first device;
obtaining fourth confirmation information from the first authentication server, wherein the first confirmation information comprises a result of an authentication performed by the first device on the first authentication server, wherein the second confirmation information comprises a result of the authentication performed by the first device on the gateway device, and wherein the fourth confirmation information comprises a result of the authentication performed by the first authentication server on the first device; and
establishing a communication connection between the first device and the gateway device based on the first confirmation information, the second confirmation information, the third confirmation information, and the fourth confirmation information.

14. The gateway device according to claim 13, wherein the instructions for obtaining the first identification code of a first device include instructions for:
receiving a first message; and
obtaining the first identification code based on the first message, wherein the first message comprises at least one of a first voice message or a first indication message, and wherein the first indication message is sent by a second device.

15. The gateway device according to claim 14, wherein the one or more computer programs further include instructions for performing, before the obtaining the first identification code of a first device:
obtaining type information of the first device; and
performing at least one of:
playing a second voice message, wherein the second voice message comprises the type information of the first device;
or sending a second message to the second device, wherein the second message comprises the type information of the first device.

16. The gateway device according to claim 15, wherein the instructions for obtaining the type information of the first device include instructions for:
sending a device identifier of the first device to the first authentication server, wherein the device identifier of the first device is obtained by the gateway device from the first device; and
obtaining the type information of the first device from the first authentication server, wherein the type information of the first device is obtained by the first authentication server based on the device identifier of the first device.

17. The gateway device according to claim 13, wherein the second authentication request comprises the second authentication information; and
  wherein the second authentication information being generated by the gateway device based on the first identification code, and wherein the second authentication request being associated with verification, by the first device, of the gateway device comprises at least one of:
    the second authentication information is generated by the gateway device based on the first identification code and a first random value, the second authentication request is associated with verification, by the first device, of the gateway device based on the first identification code, the first random value, and the second authentication information, and the first random value is related to the first authentication server; or
    the second authentication information is generated by the gateway device based on the first identification code and a first key value, the second authentication request is associated with verification, by the first device, of the gateway device based on the first identification code, the first key value, and the second authentication information, and the first key value is related to the first device.

18. The gateway device according to claim 13, wherein the third authentication information is generated by the first device based on the first identification code; and
  wherein the instructions for obtaining the third confirmation information by verifying the first device based on the first identification code and the third authentication information, to include instructions for:
    obtaining the third confirmation information by verifying the first device based on the first identification code, a second random value, and the third authentication information, wherein the third authentication information is generated by the first device based on the first identification code and the second random value, and the second random value is related to the first device.

19. An electronic device, comprising:
  one or more processors; and
  a memory, coupled to the one or more processors, the memory storing one or more computer programs for execution by the one or more processors, and wherein the one or more computer programs comprise instructions for:
    receiving a first authentication request sent by a gateway device;
    obtaining first confirmation information by verifying a first authentication server based on the first authentication request;
    receiving a second authentication request sent by the gateway device, wherein the second authentication request comprises second authentication information, and wherein the second authentication information is generated by the gateway device based on a first identification code;
    obtaining second confirmation information by verifying the gateway device based on the first identification code and the second authentication information;
    sending a third authentication request to the gateway device, wherein the third authentication request comprises third authentication information, wherein the third authentication information is generated by the electronic device based on the first identification code, and wherein the third authentication request is associated with verifying, by the gateway device, the electronic device based on the first identification code and the third authentication information;
    sending a fourth authentication request to the gateway device, wherein the fourth authentication request is sent by the gateway device to the first authentication server, and wherein the fourth authentication request is associated with verifying, by the first authentication server, the electronic device; and
    sending the first confirmation information and the second confirmation information to the gateway device.

20. A non-transitory computer storage medium comprising computer instructions, wherein the non-transitory computer storage medium stores one or computer programs program instructions, and when the program instructions are executed by a processor of a gateway device, the processor is enabled to perform:
  obtaining a first identification code of a first device;
  sending a first authentication request to the first device, wherein the first authentication request is associated with verification, by the first device, of a first authentication server;
  sending a second authentication request to the first device, wherein the second authentication request comprises second authentication information, wherein the second authentication information is generated by the gateway device based on the first identification code, and wherein the second authentication request is associated with verification, by the first device, of the gateway device based on the first identification code and the second authentication information;
  obtaining a third authentication request from the first device, wherein the third authentication request comprises third authentication information, and wherein the third authentication information is generated by the first device based on the first identification code;
  obtaining third confirmation information by verifying the first device based on the first identification code and the third authentication information;
  sending a fourth authentication request to the first authentication server, wherein the fourth authentication request is associated with verification of the first device by the first authentication server;
  obtaining, by the gateway device, first confirmation information and second confirmation information from the first device;
  obtaining fourth confirmation information from the first authentication server, wherein the first confirmation information comprises a result of an authentication performed by the first device on the first authentication server, wherein the second confirmation information comprises a result of the authentication performed by the first device on the gateway device, and wherein the fourth confirmation information comprises a result of the authentication performed by the first authentication server on the first device; and
  establishing a communication connection between the first device and the gateway device based on the first confirmation information, the second confirmation information, the third confirmation information, and the fourth confirmation information.

* * * * *